US012761787B2

(12) United States Patent
Chen

(10) Patent No.: US 12,761,787 B2
(45) Date of Patent: *Oct. 13, 2026

(54) KEY FUNCTION EXECUTION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Jingzhou Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/220,044

(22) Filed: May 27, 2025

(65) Prior Publication Data

US 2025/0284389 A1 Sep. 11, 2025

Related U.S. Application Data

(63) Continuation of application No. 18/295,623, filed on Apr. 4, 2023, now Pat. No. 12,340,083, which is a (Continued)

(30) Foreign Application Priority Data

Jun. 22, 2021 (CN) ........................ 202110693794.4

(51) Int. Cl.
*G06F 3/04886* (2022.01)
*G06F 3/01* (2006.01)
*G06F 3/04812* (2022.01)

(52) U.S. Cl.
CPC .......... *G06F 3/04886* (2013.01); *G06F 3/014* (2013.01); *G06F 3/04812* (2013.01); *G06F 2203/04803* (2013.01)

(58) Field of Classification Search
CPC .. G06F 3/04886; G06F 3/014; G06F 3/04812; G06F 2203/04803; G06F 3/017; G06F 3/018; G06F 3/0233; G06F 3/0236; G06F 3/0482; G06F 3/04842; G06F 3/04892; G06F 3/04883; G06F 21/32
See application file for complete search history.

(56) References Cited

U.S. PATENT DOCUMENTS

2013/0057475 A1* 3/2013 Duggan .............. G06F 3/04886 345/168
2013/0271369 A1* 10/2013 Lu ........................... G06F 3/042 345/157

(Continued)

*Primary Examiner* — Temesghen Ghebretinsae
*Assistant Examiner* — Sosina Abebe
(74) *Attorney, Agent, or Firm* — Anova Law Group, PLLC

(57) ABSTRACT

A key function execution method includes: displaying a virtual keyboard; displaying, in response to detecting that a hand is in a target gesture, a cursor at a first position according to a biometric feature of the target gesture; displaying, in response to the hand making a movement while keeping the target gesture, that the cursor moves with the movement of the hand; and executing, in response to a change in a gesture of the hand, a function of a key corresponding to a second position of the virtual keyboard, the second position being a position where the cursor is located when the gesture of the hand changes.

20 Claims, 15 Drawing Sheets

Related U.S. Application Data continuation of application No. PCT/CN2022/093610, filed on May 18, 2022.

(56) References Cited

U.S. PATENT DOCUMENTS

| | | | | |
|---|---|---|---|---|
| 2015/0040040 | A1* | 2/2015 | Balan | G06F 3/011<br>715/762 |
| 2020/0387214 | A1* | 12/2020 | Ravasz | G06F 3/011 |

* cited by examiner

KEY FUNCTION EXECUTION METHOD AND APPARATUS, DEVICE, AND STORAGE MEDIUM

CROSS-REFERENCES TO RELATED APPLICATIONS

This application is a continuation of U.S. patent application Ser. No. 18/295,623 filed on Apr. 4, 2023; U.S. patent application Ser. No. 18/295,623 is a continuation application of PCT Patent Application No. PCT/CN2022/093610, entitled "KEY FUNCTION EXECUTION METHOD, APPARATUS AND DEVICE, AND STORAGE MEDIUM" and filed on May 18, 2022, which claims priority to Chinese Patent Application No. 202110693794.4, entitled "KEY FUNCTION EXECUTION METHOD AND APPARATUS, DEVICE, AND STORAGE MEDIUM" filed with the Chinese Patent Office on Jun. 22, 2021, the entire contents of both of which are incorporated herein by reference.

FIELD OF THE TECHNOLOGY

The present disclosure relates to the field of computer technologies, and in particular, to a key function execution method and apparatus, a device, and a storage medium.

BACKGROUND OF THE DISCLOSURE

With the development of computer technologies, keys are displayed through electronic devices, and users operate the keys to trigger the electronic devices to automatically perform corresponding functions, which greatly reduces labor costs and realizes intelligence.

At present, a key function execution method is generally to display a virtual keyboard on a screen, and in response to detecting a user's touch operation on the screen, execute a function of a key corresponding to a contact of the touch operation.

SUMMARY

Embodiments of the present disclosure provide a key function execution method and apparatus, a device, and a storage medium, which improves granularity and accuracy of key triggering and has better applicability. The technical solutions are as follows:

According to one aspect, a key function execution method is provided, the method including: displaying, by a key function execution system, a virtual keyboard, the virtual keyboard including a first region and a second region, the first region and the second region respectively including at least two keys, the first region corresponding to a left hand, and the second region corresponding to a right hand; displaying, in response to detecting that a hand is in a target gesture, a cursor at a first position according to a biometric feature of the target gesture, the first position being located in a region corresponding to the biometric feature in the virtual keyboard, the first position being a position corresponding to the biometric feature; displaying, in response to the hand making a movement while keeping the target gesture, that the cursor moves with the movement of the hand; and executing, in response to a change in a gesture of the hand, a function of a key corresponding to a second position of the virtual keyboard, the second position being a position where the cursor is located when the gesture of the hand changes.

According to one aspect, a key function execution system is provided, the system including an electronic device, a gesture tracking sensor, and a display device; the gesture tracking sensor and the display device being connected to the electronic device respectively; the display device being configured to display a virtual keyboard, the virtual keyboard including a first region and a second region, the first region and the second region respectively including at least two keys, the first region corresponding to a left hand, and the second region corresponding to a right hand; the gesture tracking sensor being configured to detect that a hand is in a target gesture; the display device being further configured to display, in response to detecting that the hand is in the target gesture, a cursor at a first position according to a biometric feature of the target gesture, the first position being located in a region corresponding to the biometric feature in the virtual keyboard, the first position being a position corresponding to the biometric feature; the gesture tracking sensor being further configured to detect that the hand makes a movement while keeping the target gesture; the display device being further configured to display, in response to the hand making a movement while keeping the target gesture, that the cursor moves with the movement of the hand; and the electronic device being configured to execute, in response to a change in a gesture of the hand, a function of a key corresponding to a second position of the virtual keyboard, the second position being a position where the cursor is located when the gesture of the hand changes.

According to one aspect, an electronic device is provided, the electronic device including one or more processors and one or more memories, the one or more memories storing at least one computer program, the at least one computer program being loaded and executed by the one or more processors to implement various example implementations of the above key function execution method.

According to one aspect, a non-transitory computer-readable storage medium is provided, the storage medium storing at least one computer program, the at least one computer program being loaded and executed by a processor to implement various example implementations of the above key function execution method.

In the embodiments of the present disclosure, a combination of two operations, i.e., a gesture and movement, provides a flexible and easy-to-operate manner for a scene of triggering a key in the virtual keyboard. In the manner, a user can trigger the display of the cursor only by making a target gesture with a hand, and then can control the cursor to move by moving the hand while holding the target gesture. This operation is very simple and convenient and can also control the cursor to move to accurately select and trigger a single key, thereby improving granularity and accuracy of key triggering, which can realize input of any form of characters and thus has better applicability. In addition, when the target gesture is detected, a display position of the cursor can also be determined based on a biometric feature of the target gesture, so that the user can flexibly use different hands for gesture operations, so as to minimize a movement distance of the cursor, reduce operational complexity, and improve operational efficiency.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

The terms "first", "second", and the like in the present disclosure are used for distinguishing same items or similar items of which effects and functions are basically the same. It is to be understood that the "first", "second", and "nth" neither have a dependency relationship in logic or time sequence nor limit a quantity and an execution order. It is to be further understood that, although terms such as first and second are used to describe various elements in the following description, these elements are not to be limited by these terms. These terms are merely used for distinguishing one element from another element. For example, without departing from the scope of various examples, a first image may be referred to as a second image, and similarly, a second image may also be referred to as a first image. Both the first image and the second image may be images, and in some cases, may be independent and different images.

The term "at least one" in the present disclosure means one or more, and "a plurality of" in the present disclosure means two or more. For example, "a plurality of keys" means two or more keys.

The following describes an implementation environment of the present disclosure.

Figure 1:
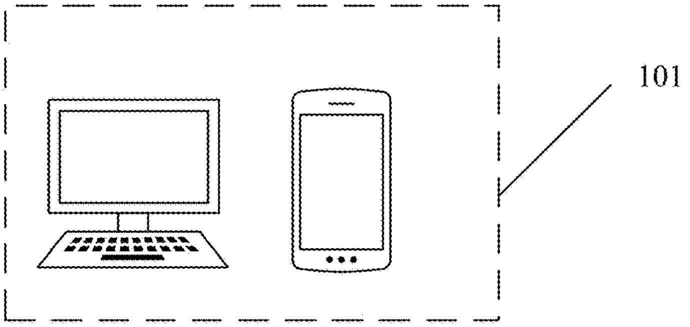
FIG. 1 is a schematic diagram of an implementation environment of a key function execution method according to an embodiment of the present disclosure.
Figure 2:
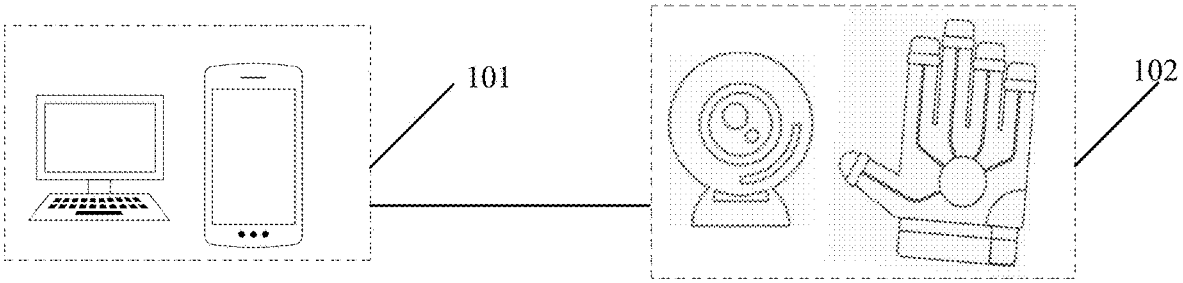
FIG. 2 is a schematic diagram of an implementation environment of another key function execution method according to an embodiment of the present disclosure.
Figure 3:
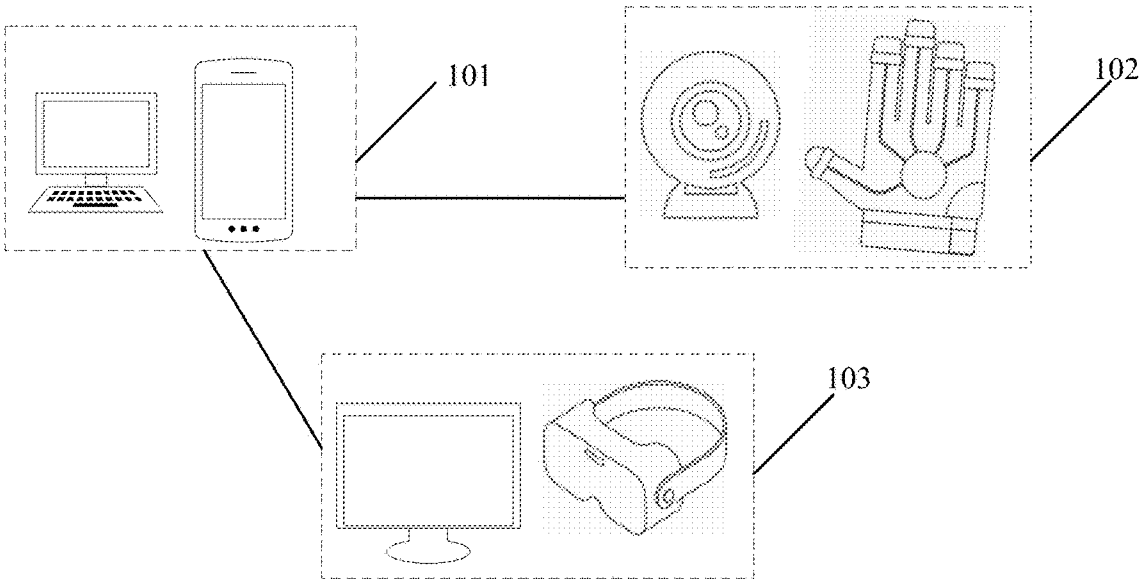
FIG. 3 is a schematic diagram of an implementation environment of another key function execution method according to an embodiment of the present disclosure.
Figure 4:
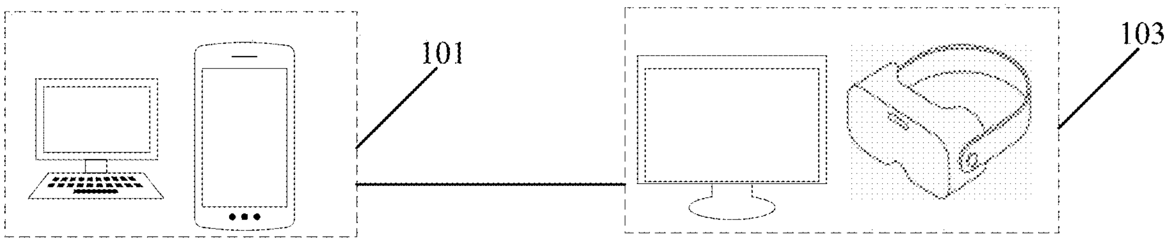
FIG. 4 is a schematic diagram of an implementation environment of another key function execution method according to an embodiment of the present disclosure.

FIG. 1, FIG. 2, FIG. 3, and FIG. 4 are schematic diagrams of an implementation environment of a key function execution method according to an embodiment of the present disclosure. As shown in FIG. 1, the implementation environment includes a terminal 101. As shown in FIG. 2, the implementation environment includes a terminal 101 and a gesture tracking sensor 102. As shown in FIG. 3, the implementation environment includes a terminal 101, a gesture tracking sensor 102, and a display device 103. As shown in FIG. 4, the implementation environment includes a terminal 101 and a display device 103.

The terminal 101 is at least one of a smartphone, a game console, a desktop computer, a tablet computer, an ebook reader, a Moving Picture Experts Group Audio Layer III (MP3) player, a Moving Picture Experts Group Audio Layer IV (MP4) player, and a portable laptop computer. An application program supporting key function execution is installed and run on the terminal 101. For example, the application program may be a system application, a virtual reality (VR) application, an instant messaging application, a news push application, a shopping application, an online video application, or a social application.

As shown in FIG. 1, the implementation environment includes a terminal 101, and a gesture tracking sensor and a screen display are installed on the terminal 101. In this way, the terminal can track a hand of a user through the gesture tracking sensor, and can recognize a gesture or an action made by the hand to trigger an instruction corresponding to the gesture or action. The terminal further has a display function, which can display a virtual keyboard through the screen display, and when recognizing the gesture or action of the hand, can display a corresponding change according to the gesture or action through the screen display. For example, the gesture tracking sensor is a camera. The camera can shoot the hand to capture the gesture or action of the hand.

As shown in FIG. 2, the implementation environment includes a terminal 101 and a gesture tracking sensor 102. The terminal 101 and the gesture tracking sensor 102 are connected through a wired or wireless network. The terminal 101 has a display function, which can display a virtual keyboard on a screen display. The gesture tracking sensor 102 can track a hand of a user, recognize a gesture or an action made by the hand, and then send a recognition result to the terminal 101. The terminal 101 can display corresponding content in the virtual keyboard according to the recognition result.

The gesture tracking sensor is any gesture sensor, such as a Leap Motion sensor or a finger tracking glove, which is not limited in this embodiment of the present disclosure.

As shown in FIG. 3, the implementation environment includes a terminal 101, a gesture tracking sensor 102, and a display device 103. The terminal 101 is respectively connected to the gesture tracking sensor 102 and the display device 103 through a wired or wireless network. The terminal 101 has a data processing function. The terminal 101 controls the display device 103 to display a virtual keyboard. The gesture tracking sensor 102 can track a hand of a user, recognize a gesture or an action made by the hand, and then send a recognition result to the terminal 101. The terminal 101 can control the display device 103 to display corresponding content in the virtual keyboard according to the recognition result.

The display device is any display device, such as a screen display or a VR head-mounted display device (referred to as a VR head-mounted display), which is not limited in this embodiment of the present disclosure.

As shown in FIG. 4, the implementation environment includes a terminal 101 and a display device 103. The terminal 101 is connected to the display device 103 through a wired or wireless network. The terminal 101 has a data processing function. The terminal 101 controls the display device 103 to display a virtual keyboard. A gesture tracking sensor is installed on the terminal 101 which can track a hand of a user through the installed gesture tracking sensor and recognize a gesture or an action made by the hand. Then, the terminal 101 determines a change in display content according to the gesture or action and displays the content through the display device 103.

Figure 5:
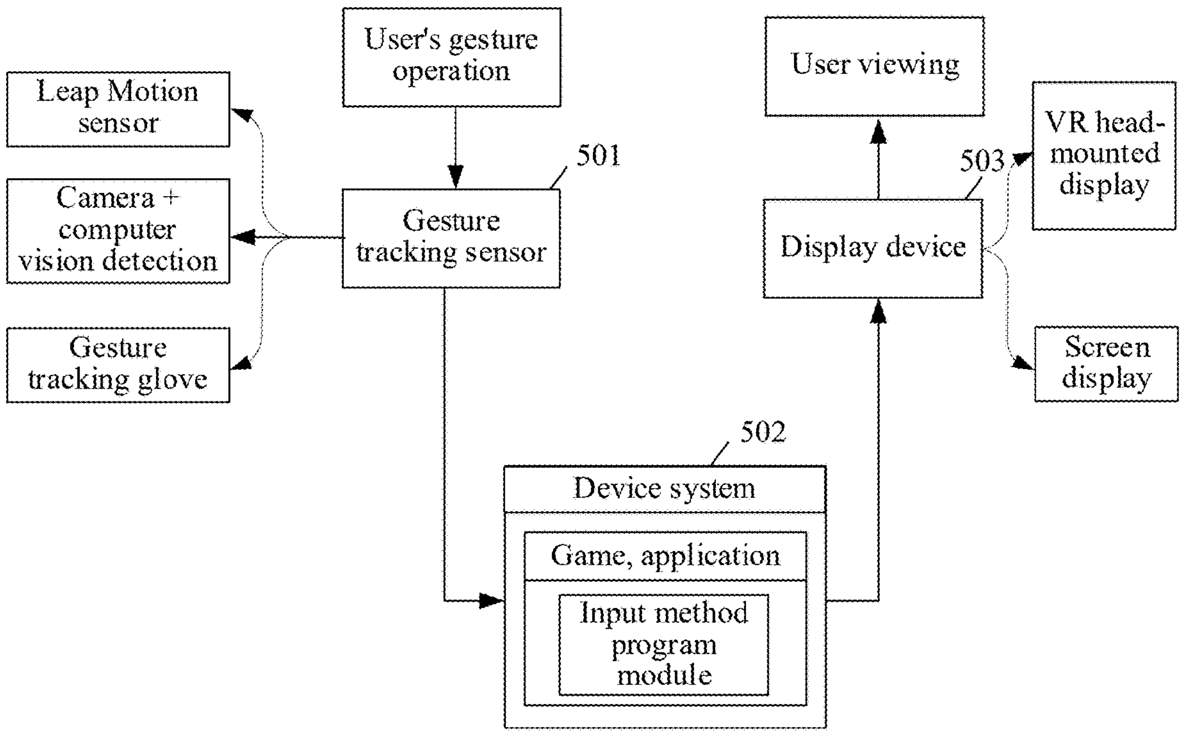
FIG. 5 is a schematic diagram of an implementation environment of yet another key function execution method according to an embodiment of the present disclosure.

Four example implementation environments are provided above, and which one is specifically used is not limited in this embodiment of the present disclosure. The following is a comprehensive description of the implementation environment of the key function implementation method through FIG. 5. As shown in FIG. 5, the implementation environment includes a gesture tracking sensor 501, a device system 502, and a display device 503. The gesture tracking sensor 501 is connected to the device system 502.

The gesture tracking sensor 501 is configured to detect and track a finger operation of a user. The gesture tracking sensor 501 may be different types of devices, such as a Leap Motion sensor, a camera, and a finger tracking glove. The gesture tracking sensor 501 can obtain rotation and coordinate information of each finger joint.

The device system 502 can run a game application or another application program, and the application includes an input method program module. The device system can run the input method program module in the program.

The display device 503 can display a picture. The display device 503 is a VR head-mounted display, a screen display, or the like.

Figure 6:
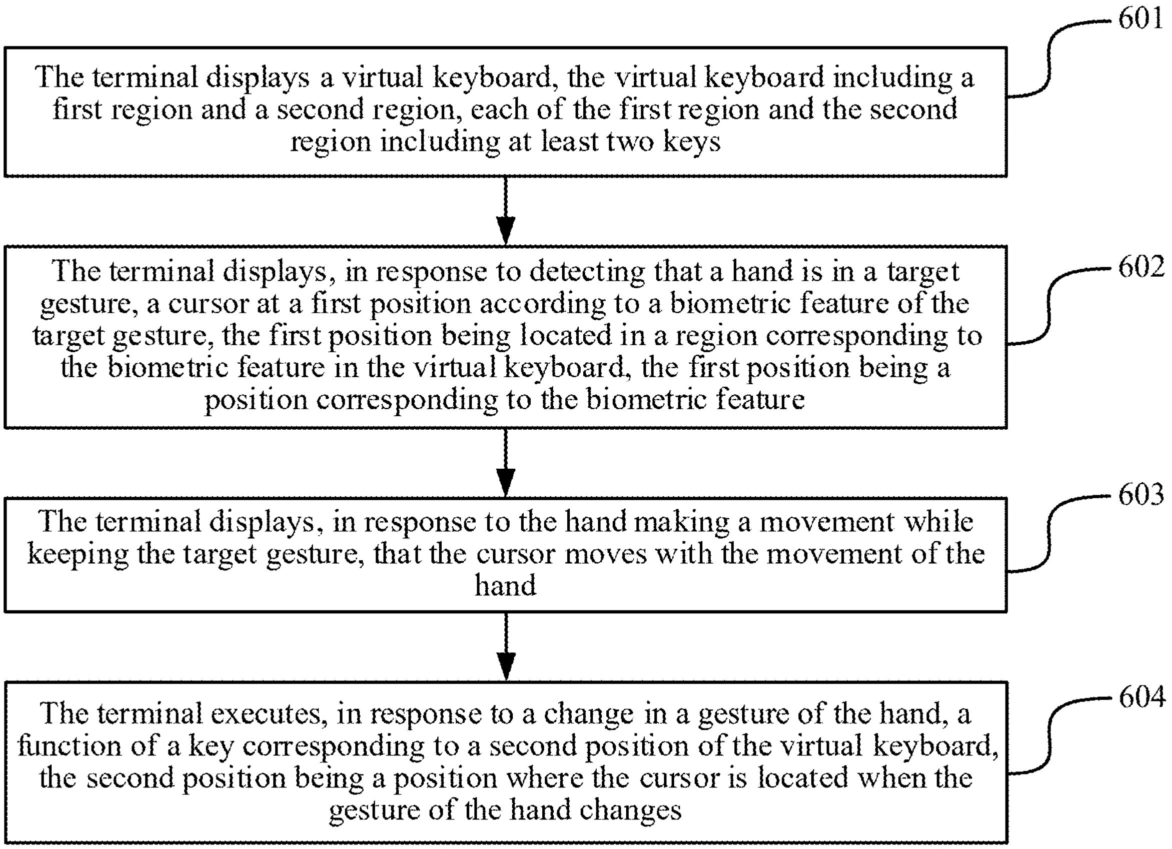
FIG. 6 is a flowchart of a key function execution method according to an embodiment of the present disclosure.

FIG. 6 is a flowchart of a key function execution method according to an embodiment of the present disclosure. The method is applied to an electronic device. The electronic device is a terminal or a server. Referring to FIG. 6, for example, the method is applied to a terminal, and the method includes the following steps:

601: The terminal displays a virtual keyboard, the virtual keyboard including a first region and a second region, each of the first region and the second region including at least two keys. The first region and the second region correspond to a left hand and a right hand respectively. That is, the first region corresponds to the left hand, and the second region corresponds to the right hand.

The virtual keyboard is a virtual keyboard displayed on a screen, and the virtual keyboard includes at least two keys. "At least two" means two or more, i.e., "a plurality of".

The keys in the virtual keyboard include various types of keys. For example, a plurality of letter keys, number keys, or symbol keys are displayed in the virtual keyboard.

In this embodiment of the present disclosure, the virtual keyboard is divided into two regions: a first region and a second region. The first region corresponds to a left hand, and the second region corresponds to a right hand. Each region includes at least two keys. When any key is operated, a function of the key can be triggered. In this way, the user can use different hands to make a target gesture to control triggering of keys in different regions of the virtual keyboard.

602: The terminal displays, in response to detecting that a hand is in a target gesture, a cursor at a first position according to a biometric feature of the target gesture, the first position being located in a region corresponding to the biometric feature in the virtual keyboard, the first position being a position corresponding to the biometric feature.

In this embodiment of the present disclosure, the user makes a gesture with the hand without touching a display screen, and the terminal detects the gesture of the hand, determines an operational position corresponding to the virtual keyboard based on the gesture, and then further determines a key that the user really wants to trigger, to execute a function of the key.

For the target gesture, in some embodiments, the virtual keyboard is associated with the biometric feature of the hand. When the biometric feature varies, a corresponding position of the target gesture in the virtual keyboard may be different. The biometric feature is used for indicating which hand is performing the gesture, or the biometric feature is also used for indicating which fingers are performing the gesture.

In one embodiment, the terminal detects a gesture of the hand, and when determining that the hand is in the target gesture, determines the first position in the region corresponding to the biometric feature according to the biometric feature of the target gesture. The first position is an initial display position of the cursor. The terminal displays the cursor at the first position to indicate that an operational position corresponding to a position where the hand is currently located is the first position. In this way, the hand can trigger the terminal to display the cursor at the first position only by making the target gesture without touching the screen.

Understandably, the virtual keyboard is divided into two regions. When the user uses the left hand to make the target gesture, the region corresponding to the biometric feature is the first region. When the user uses the right hand to make the target gesture, the region corresponding to the biometric feature is the second region.

603: The terminal displays, in response to the hand making a movement while keeping the target gesture, that the cursor moves with the movement of the hand.

In this embodiment of the present disclosure, two operations, i.e., a gesture and movement, are combined, and after the target gesture is made, if the user does not actually trigger the key at the first position, the target gesture is held to move the hand, so that the terminal can track the hand to control the cursor to move with the movement of the hand. In this way, the user can easily move the cursor only by moving the hand, to precisely select a key that the user wants to trigger. The simple operation can realize precise triggering of the key and improve accuracy and flexibility of key function execution.

604: The terminal executes, in response to a change in a gesture of the hand, a function of a key corresponding to a second position of the virtual keyboard, the second position being a position where the cursor is located when the gesture of the hand changes.

Through step 603 above, the position of the cursor has changed, which may move to another position or move back to the first position. The user, after moving the cursor to a position of the key that the user wants to trigger, may change the gesture, that is, no longer holds the target gesture. In this way, the terminal can determine that the user wants to trigger a key at a current position of the cursor, and therefore, can execute a function of the key at the current position (i.e., the second position) of the cursor.

The second position is a position where the cursor is located when the hand no longer holds the target gesture after making a movement while keeping the target gesture. The second position is a same position as the first position, or the second position is a position different from the first position.

In this embodiment of the present disclosure, a combination of two operations, i.e., a gesture and movement, provides a flexible and easy-to-operate manner for a scene of triggering a key in the virtual keyboard. In the manner, a user can trigger the display of the cursor only by making a target gesture with a hand, and then can control the cursor to move by moving the hand while holding the target gesture. This operation is very simple and convenient and can also control the cursor to move to accurately select and trigger a single key, thereby improving granularity and accuracy of key triggering, which can realize input of any form of characters and thus has better applicability. In addition, when the target gesture is detected, a display position of the cursor can also be determined based on a biometric feature of the target gesture, so that the user can flexibly use different hands for gesture operations, so as to minimize a movement distance of the cursor, reduce operational complexity, and improve operational efficiency.

Figure 7:
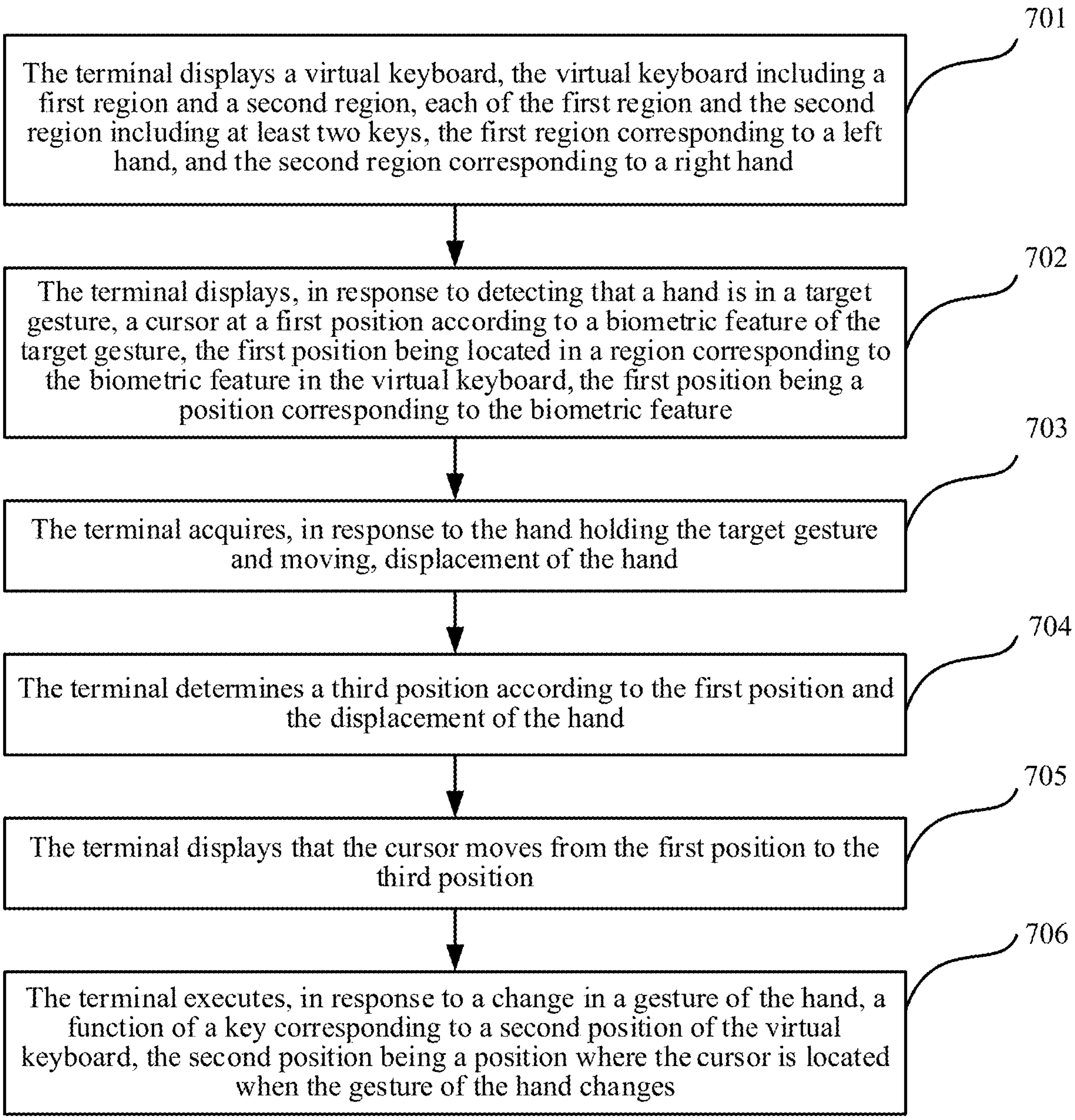
FIG. 7 is a flowchart of a key function execution method according to an embodiment of the present disclosure.

FIG. 7 is a flowchart of a key function execution method according to an embodiment of the present disclosure. Referring to FIG. 7, the method includes the following steps:

701: The terminal displays a virtual keyboard, the virtual keyboard including a first region and a second region, each of the first region and the second region including at least two keys, the first region corresponding to a left hand, and the second region corresponding to a right hand.

In some embodiments, a plurality of letter keys, number keys, or symbol keys are displayed in the virtual keyboard.

Figure 8:
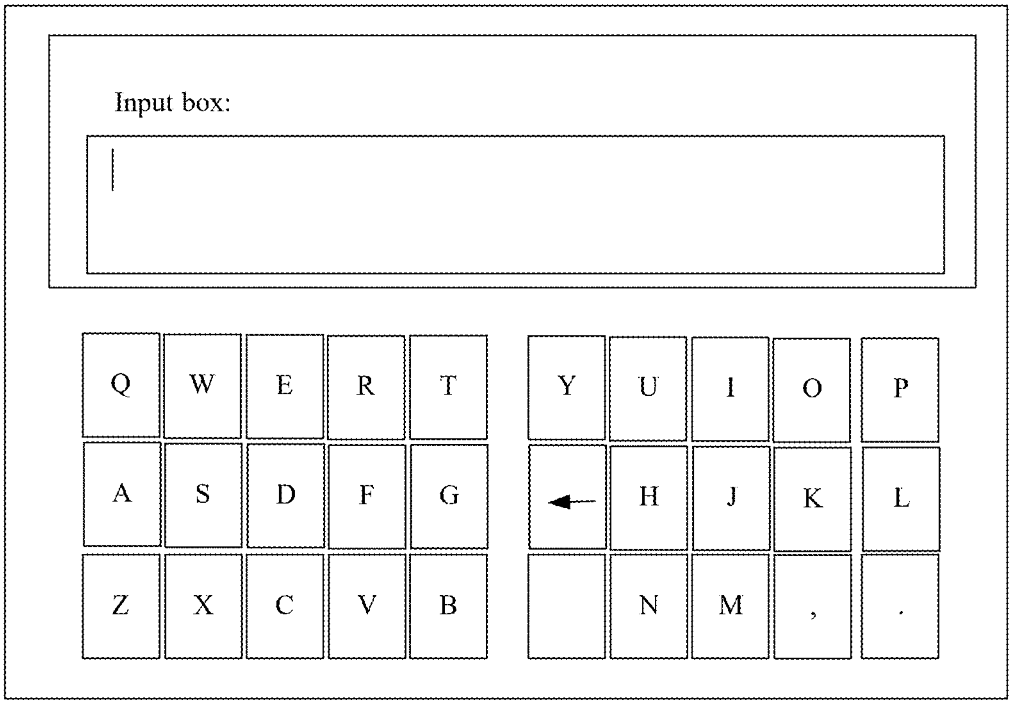
FIG. 8 is a schematic interface diagram of a terminal according to an embodiment of the present disclosure.

For example, the virtual keyboard is shown in FIG. 8, and the virtual keyboard includes a plurality of letter keys, for example, Q, A, Z, W, and the like, which are not listed one by one herein. The virtual keyboard further includes symbol keys. For example, " " is used for representing a space, and ",", ".", and the like are all symbol keys. The virtual keyboard further includes function keys. For example, "«-" is a delete key.

In some embodiments, the display of the virtual keyboard is triggered by a trigger operation on an input box. For example, the terminal displays a first page, and the input box is displayed on the first page. The user moves the hand to control the cursor to follow the hand to move into the input box, and then the hand performs a click/tap action or a slap action. The terminal detects the click/tap action or slap action of the hand and the cursor is located in the input box, and displays the virtual keyboard on the first page.

In some other embodiments, the display of the virtual keyboard is triggered by a trigger operation on a virtual keyboard control. For example, the terminal displays a first page, and the virtual keyboard control is displayed on the first page. The user moves the hand to control the cursor to follow the hand to move to a position where the virtual keyboard control is located, and then the hand performs a click/tap action or a slap action. The terminal detects the click/tap or slap action of the hand and the cursor is located at the position where the virtual keyboard control is located, and displays the virtual keyboard on the first page.

702: The terminal displays, in response to detecting that a hand is in a target gesture, a cursor at a first position according to a biometric feature of the target gesture, the first position being located in a region corresponding to the biometric feature in the virtual keyboard, the first position being a position corresponding to the biometric feature.

In this embodiment of the present disclosure, the user can trigger the selection of the key in the virtual keyboard and execute the function of the key by making the target gesture or moving after making the target gesture without touching the display screen.

In some embodiments, the terminal captures a gesture, an action, or a position of the hand of the user through the gesture tracking sensor.

In some embodiments, the gesture tracking sensor is a sensor installed on the terminal. For example, the gesture tracking sensor may be a camera installed on the terminal. Correspondingly, the terminal shoots the user based on the camera, and then analyzes a shot image through computer vision detection to determine the gesture, action, or position of the hand of the user. For example, during the computer vision detection, the position of the hand is determined by detecting the hand in the image, and then shapes of various fingers are determined and matched with shapes of various fingers in a candidate gesture to determine a current gesture of the hand.

In some embodiments, the gesture tracking sensor is a gesture tracking sensor outside the terminal. For example, the gesture tracking sensor is a Leap Motion sensor, a finger tracking glove, or a camera device. The finger tracking glove can capture rotation and positions of various knuckles of the hand, and then shapes of various fingers are analyzed through the rotation and the positions of the knuckles and matched with shapes of various fingers in a candidate gesture to obtain a current gesture of the hand by matching.

In some embodiments, the target gesture is a pinch gesture. That is, a thumb and a pulp of another finger of one hand fit together. The terminal captures an image of the hand or acquires shape parameters of the hand through the finger tracking glove, and then determines, through gesture recognition, a candidate gesture with a matching degree, which is higher than a matching degree threshold and a maximum matching degree, as the target gesture. Then, a step of displaying the cursor is performed based on the determined target gesture. Certainly, the target gesture may also be another gesture. For example, the target gesture is a gesture with five fingers together, the target gesture is a first gesture, or the like. The target gesture is set by a relevant technician according to a requirement, or set by the user according to his/her own operation habit, which is not limited in this embodiment of the present disclosure.

The gesture recognition includes three parts: gesture segmentation, gesture analysis, and recognition. Gesture segmentation methods include gesture segmentation based on monocular vision, gesture segmentation based on stereo vision, and the like.

The monocular vision is to use an image capture device to capture an image of a gesture, so as to establish a plane model of the gesture, and match the plane model with gestures in a gesture shape database to determine a type of the gesture. A method of establishing the gesture shape database is to establish all gestures that can be considered, which is conducive to template matching of gestures, but requires a larger amount of calculation, being not conducive to rapid recognition of the system.

The stereo vision is to use a plurality of image capture devices to obtain different images of gestures, and convert different images of a same gesture into a three-dimensional model of the gesture. A method of stereo matching is similar to a template matching method in the monocular vision, which also requires establishment of a large gesture library, and performs three-dimensional reconstruction on various gestures in the gesture library. The three-dimensional reconstruction requires establishment of three-dimensional models of the gestures, which may increase the amount of calculation but has a better segmentation effect.

The gesture analysis is one of the key technologies for completing gesture recognition. A shape feature or motion trajectory of the gesture can be obtained through the gesture analysis. The shape feature and the motion trajectory of the gesture are important features in dynamic gesture recognition, which are directly related to a meaning expressed by the gesture. There are several types of gesture analysis methods: an edge contour extraction method, a multi-feature combination method such as centroid fingers, a knuckle tracking method, and the like. For example, the edge contour extraction method is a gesture analysis method, and a hand shape is distinguished from another object due to a unique shape thereof. Alternatively, by using a gesture recognition algorithm that combines geometric moment and edge detection, a distance between images is calculated by setting weights of two features to realize recognition of a letter gesture. The multi-feature combination method is to analyze a posture or trajectory of the gesture according to physical characteristics of the hand. MeenakshiPanwar combines a shape of a gesture and a fingertip feature of a finger to realize gesture recognition. The knuckle tracking method is mainly to build a two-dimensional or three-dimensional model of the hand, and then perform tracking according to a position change of a joint point of the hand, which is mainly applied to dynamic trajectory tracking.

The gesture recognition is a process of classifying trajectories in a model parameter space into a subset in the space, including static gesture recognition and dynamic gesture recognition. The dynamic gesture recognition may eventually be transformed into the static gesture recognition. From the perspective of technical implementation of the gesture recognition, gesture recognition methods mainly include: a template matching method, a neural network method, and a hidden Markov model (HMM) method.

The template matching method is to regard a gesture action as a sequence formed by static gesture images, and then compare a to-be-recognized gesture sequence with a known gesture template sequence to recognize a gesture.

The HMM method is a statistical model. A system modeled with hidden Markov has a double stochastic process, which includes stochastic processes of state transition and observation output. The stochastic process of state transition is implicit, manifested by a stochastic process of an observation sequence.

For the target gesture, in some embodiments, the virtual keyboard is associated with the biometric feature of the hand. When the biometric feature varies, a corresponding position of the target gesture in the virtual keyboard is different. The biometric feature is used for indicating which hand is making the gesture, or the biometric feature is also used for indicating which finger is making the gesture.

In some embodiments, in step 702, the terminal first determines the first position, and then displays the cursor at the first position. In some embodiments, the terminal determines, in response to detecting that the hand is in the target gesture, the first position in the region corresponding to the biometric feature in the virtual keyboard according to the biometric feature of the target gesture, and then displays the cursor at the first position of the virtual keyboard.

When the user uses a different hand, the biometric feature is different, and the region corresponding thereto may also be different. For example, the first region corresponds to the left hand, and the second region corresponds to the right hand. In step 702, the terminal displays, in response to the biometric feature indicating that the hand is the left hand, the cursor at a target position in the first region in the virtual keyboard. The terminal displays, in response to the biometric feature indicating that the hand is the right hand, the cursor at a target position in the second region in the virtual keyboard.

In other words, the terminal determines, in response to the biometric feature indicating that the hand is the left hand, that the target position in the first region in the virtual keyboard is the first position, and then displays the cursor at the first position. The terminal determines, in response to the biometric feature indicating that the hand is the right hand, that the target position in the second region in the virtual keyboard is the first position, and then displays the cursor at the first position.

Figure 9:
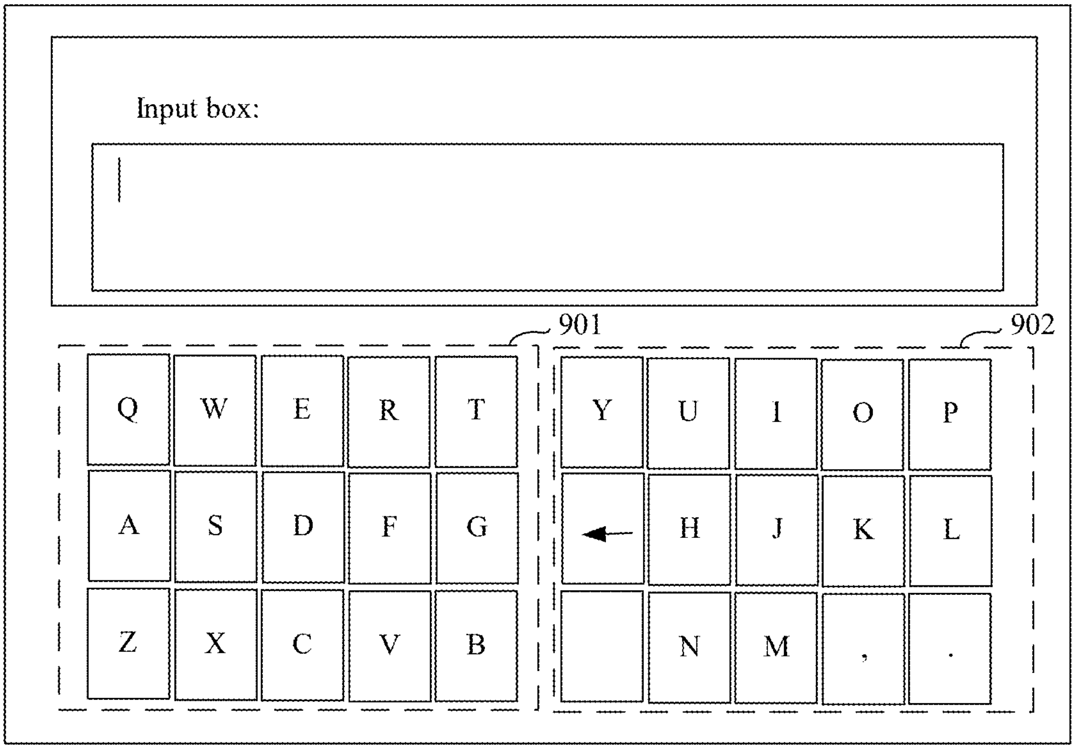
FIG. 9 is a schematic interface diagram of a terminal according to an embodiment of the present disclosure.

For example, as shown in FIG. 9, the virtual keyboard is evenly divided to obtain a left region 901 and a right region 902. The left region 901 is the first region, and the right region 902 is the second region. In this way, if the user makes the target gesture with the left hand, the corresponding first position is in the left region 901. If the user makes the target gesture with the right hand, the corresponding first position is in the right region 902.

Through the division, the user can distinguish small regions in the virtual keyboard by distinguishing left and right hands. The user can choose to use the left hand or the right hand according to a position of a key that the user wants to trigger, so that further precise selection in a small region can reduce a range of further selection, which, compared with the manner of not dividing the virtual keyboard, can reduce the user' operation of adjusting the cursor as much as possible, so as to improve operational efficiency.

In some embodiments, the first region and the second region are further divided. The first region corresponds to the left hand, and the second region corresponds to the right hand. The first region and the second region are also divided into a plurality of subregions respectively, and different fingers of the hand correspond to different subregions. The target gesture is formed by a finger and a thumb of the hand, and the finger different from the thumb corresponds to a subregion. The user can control the cursor to be displayed in different subregions by using different gestures to form the target gesture with the thumb.

Correspondingly, in step 302, the terminal determines, in response to the biometric feature indicating that the hand is the left hand and the target gesture is formed by the first finger and a thumb of the hand, that the cursor is displayed at a target position in a subregion corresponding to the first finger in the first region in the virtual keyboard.

The terminal determines, in response to the biometric feature indicating that the hand is the right hand and the target gesture is formed by a second finger and a thumb of the hand, that the cursor is displayed at a target position in a subregion corresponding to the second finger in the second region in the virtual keyboard.

In an example, the first region is divided into two subregions, and the second region is also divided into two subregions. The first subregion of the first region corresponds to the second finger of the left hand, and the second subregion of the first region corresponds to the third finger of the left hand. The third subregion of the second region corresponds to the fourth finger of the right hand, and the fourth subregion of the second region corresponds to the fifth finger of the right hand. Understandably, a hand includes four fingers in addition to the thumb: an index finger, a middle finger, a ring finger, and a little finger. Which of the four fingers are the second finger and the third finger is set by a relevant technician according to a requirement, or set by the user according to an operation habit, and the same goes for the fourth finger and the fifth finger, which is not limited in this embodiment of the present disclosure.

Figure 10:
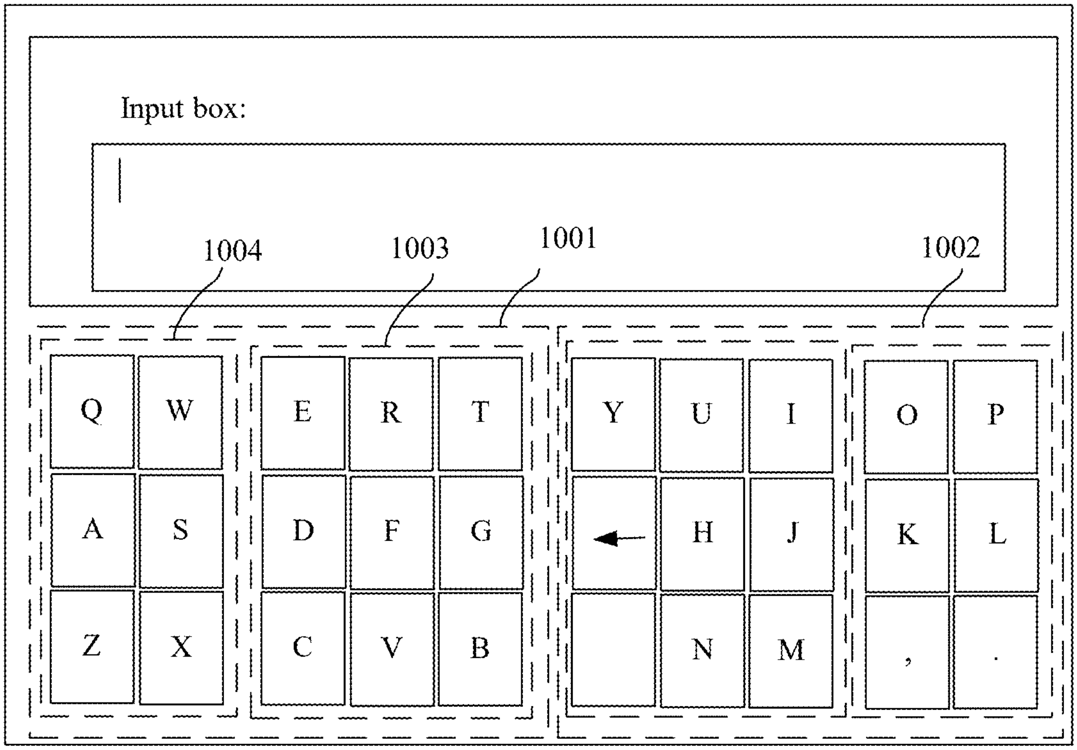
FIG. 10 is a schematic interface diagram of a terminal according to an embodiment of the present disclosure.

For example, as shown in FIG. 10, the left hand is used as input of a left half keyboard (a first region 1001), and the right hand is used as input of a right half keyboard (a second region 1002). For example, the target gesture is a pinch gesture, the second finger is a middle finger of the left hand, the third finger is an index finger of the left hand, the fourth finger is an index finger of the right hand, and the fifth finger is a middle finger of the right hand. When the user uses the index finger and the thumb of the left hand for pinching, the cursor appears in a second subregion 1003 of the first region 1001 to control triggering of keys E, R, T, D, F, G, C, V, and B. When the user uses the middle finger and the thumb of the left hand for pinching, the cursor appears in a first subregion 1004 of the first region 1001 to control triggering of keys Q, W, A, S, Z, and X.

In some embodiments, the target position is a central position of a region. In this way, the cursor is displayed at the central position. If the user subsequently wants to move the cursor to select a key, a sum of distances to other keys can be guaranteed to be minimum. In this way, a distance at which the user moves the cursor can be greatly reduced, making the operation more convenient and more efficient.

Taking the virtual keyboard shown in FIG. 10 as an example, when the user uses the index finger and the thumb of the left hand for pinching, the cursor appears on the key F at the central position in the second subregion 1003 of the first region 1001. When the user uses the middle finger and the thumb of the left hand for pinching, the cursor appears between the keys A and S at the central position in the first subregion 1004 of the first region 1001.

In another example, the first region is divided into three subregions, and the second region is also divided into three subregions. The first subregion of the first region corresponds to the second finger of the left hand, and the second subregion of the first region corresponds to the third finger of the left hand. The third subregion of the first region corresponds to the fourth finger of the right hand. The fourth subregion of the second region corresponds to the fifth finger of the right hand, the fifth subregion of the second region corresponds to the sixth finger of the right hand, and the sixth subregion of the second region corresponds to the seventh finger of the right hand. Which of the four fingers are the second finger, the third finger, and the fourth finger is set by a relevant technician according to a requirement, or set by the user according to an operation habit, and the same goes for the fifth finger, the sixth finger, and the seventh finger, which is not limited in this embodiment of the present disclosure.

Figure 11:
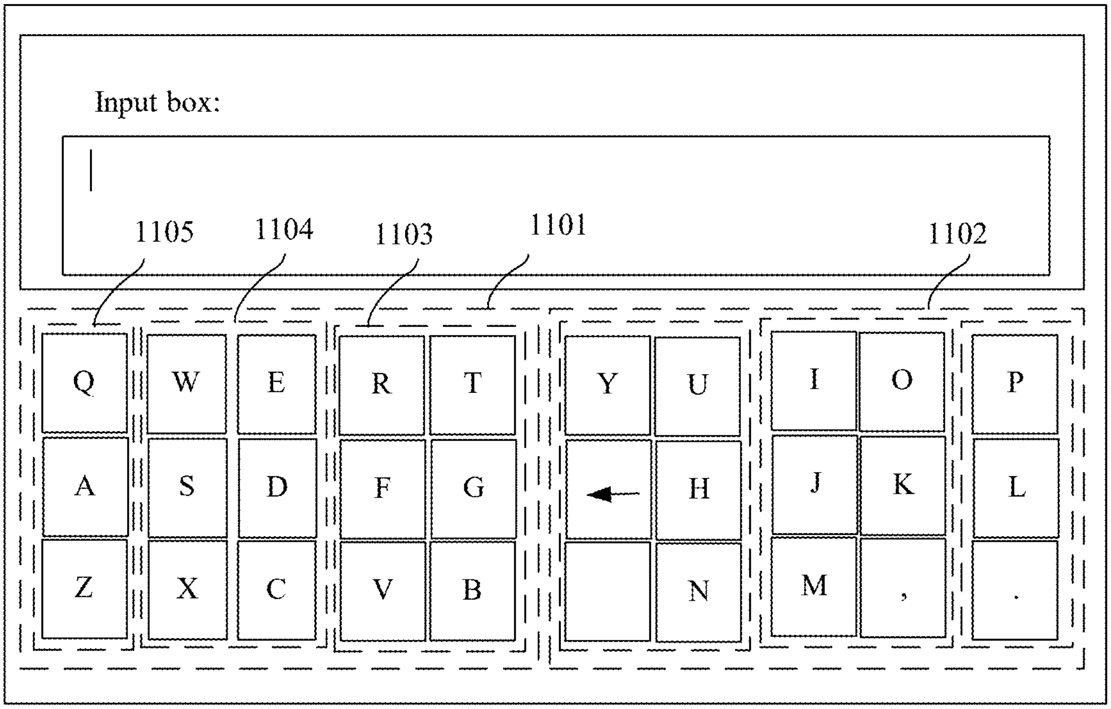
FIG. 11 is a schematic interface diagram of a terminal according to an embodiment of the present disclosure.

For example, as shown in FIG. 11, the left hand is used as input of a left half keyboard (a first region 1101), and the right hand is used as input of a right half keyboard (a second region 1102). For example, the target gesture is a pinch gesture, the second finger, the third finger, and the fourth finger are the ring finger, the middle finger, and the index finger of the left hand respectively, and the fifth finger, the sixth finger, and the seventh finger are the index finger, the middle finger, and the ring finger of the right hand respectively. When the user uses the index finger and the thumb of the left hand for pinching, the cursor appears in a third subregion 1103 of the first region 1101 to control triggering of keys R, T, F, G, V, and B. When the user uses the index finger and the thumb of the left hand for pinching, the cursor appears in a second subregion 1104 of the first region 1101 to control triggering of keys W, E, S, D, X, and C. When the user uses the middle finger and the thumb of the left hand for pinching, the cursor appears in a first subregion 1105 of the first region 1101 to control triggering of keys Q, A, and X. The same goes for the right hand, and details are not described herein.

In some embodiments, the target position is a central position of a region. Taking the virtual keyboard shown in FIG. 11 as an example, when the user uses the index finger and the thumb of the left hand for pinching, the cursor appears between the keys F and G at the central position in the second subregion 1103 of the first region 1101.

In another example, the first region is divided into four subregions, and the second region is also divided into four subregions. The first subregion of the first region corresponds to the second finger of the left hand, and the second subregion of the first region corresponds to the third finger of the left hand. The third subregion of the first region corresponds to the fourth finger of the right hand, and the fourth subregion of the first region corresponds to the fifth finger of the left hand. The fifth subregion of the second region corresponds to the sixth finger of the right hand, the sixth subregion of the second region corresponds to the seventh finger of the right hand, the seventh subregion of the second region corresponds to the eighth finger of the right hand, and the ninth subregion of the second region corresponds to the ninth finger of the right hand. Which of the four fingers are the second finger, the third finger, the fourth finger, and the fifth finger is set by a relevant technician according to a requirement, or set by the user according to an operation habit, and the same goes for the sixth finger, the seventh finger, the eighth finger, and the ninth finger, which is not limited in this embodiment of the present disclosure.

Figure 12:
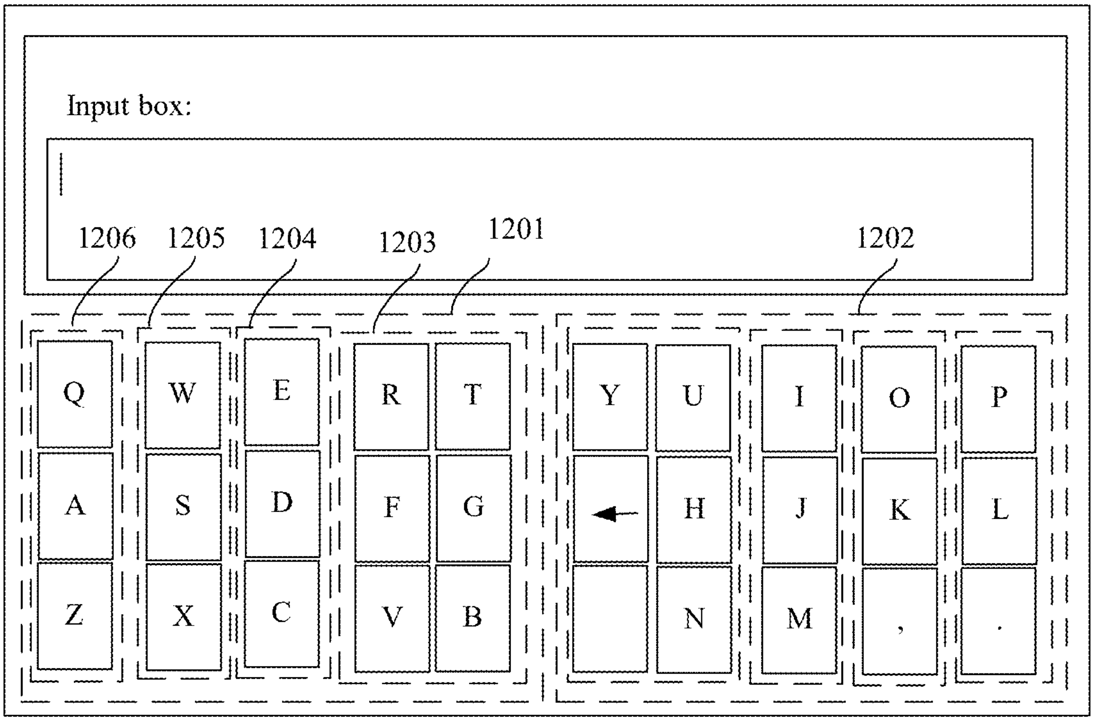
FIG. 12 is a schematic interface diagram of a terminal according to an embodiment of the present disclosure.

For example, as shown in FIG. 12, the left hand is used as input of a left half keyboard (a first region 1201), and the right hand is used as input of a right half keyboard (a second region 1202). For example, the target gesture is a pinch gesture, the second finger, the third finger, the fourth finger, and the fifth finger are the little finger, the ring finger, the middle finger, and the index finger of the left hand respectively, and the sixth finger, the seventh finger, the eighth finger, and the ninth finger are the index finger, the middle finger, the ring finger, and the little finger of the right hand respectively. When the user uses the index finger and the thumb of the left hand for pinching, the cursor appears in a fourth subregion 1203 of the first region 1201 to control triggering of keys R, T, F, G, V, and B. When the user uses the middle finger and the thumb of the left hand for pinching, the cursor appears in a third subregion 1204 of the first region 1201 to control triggering of keys E, D, and C. When the user uses the ring finger and the thumb of the left hand for pinching, the cursor appears in a second subregion 1205 of the first region 1201 to control triggering of keys W, S, and X. When the user uses the little finger and the thumb of the left hand for pinching, the cursor appears in a first subregion 1206 of the first region 1201 to control triggering of keys Q, A, and X. The same goes for the right hand, and details are not described herein.

In some embodiments, the target position is a central position of a region. Taking the virtual keyboard shown in FIG. 12 as an example, when the user uses the index finger and the thumb of the left hand for pinching, the cursor appears between the keys F and G at the central position in the fourth subregion 1203 of the first region 1201. When the user uses the middle finger and the thumb of the left hand for pinching, the cursor appears between the key D at the central position in the third subregion 1204 of the first region 1201.

The terminal, when detecting that the hand is in the target gesture, may also determine the biometric feature of the target gesture. If the biometric feature indicates that the first finger and the thumb of the hand form the target gesture and there is no corresponding first position for the first finger, this operation is ignored.

703: The terminal acquires, in response to the hand making a movement while keeping the target gesture, displacement of the hand.

The above first position is an initial display position of the cursor. The initial display position may be on a key or between keys, and the user can move the hand to control the movement of the cursor.

The terminal acquires the displacement of the hand when the hand moves while holding the target gesture. A process of acquiring the displacement of the hand may include the same steps as the above for gesture recognition. The terminal captures two images of the hand, and recognizes a position of the hand to determine a change in the position of the hand in the two images, that is, the displacement.

Alternatively, the above features such as rotation determined by the gesture tracking sensor are used for describing shapes of fingers, and are also used for determine a position of each knuckle of the hand (the position may be expressed by coordinates). Then, when the hand moves, the terminal may also continue to acquire the position of each knuckle of the hand, so as to compare the position with the above position acquired in step 702 to determine the displacement of the hand.

704: The terminal determines a third position according to the first position and the displacement of the hand.

The initial display position (the first position) of the cursor is known, and the terminal determines displacement of the cursor through a position of movement of the hand and then determines, through the first position and the displacement of the cursor, the third position that is the position to which the cursor is to move.

The terminal may determine the displacement of the cursor according to the displacement of the hand in a variety of implementation manners. In some embodiments, the terminal takes the displacement of the hand as the displacement of the cursor. In some other embodiments, the terminal may determine the displacement of the cursor according to the displacement of the hand and sensitivity.

The sensitivity is set by a relevant technician according to a requirement, or set by the user according to his/her own operation habit, which is not limited in this embodiment of the present disclosure.

705: The terminal displays that the cursor moves from the first position to the third position.

After determining the third position, the terminal may control the cursor to move from the first position to the third position, thereby reflecting an effect that the cursor moves with the movement of the hand.

Step 703 to step 705 above are example embodiments of displaying, in response to the hand making a movement while keeping the target gesture, that the cursor moves with the movement of the hand. The above is described with an example in which the cursor is controlled to move by determining the position of the cursor according to the displacement of the hand. The process may also be implemented in another manner. For example, the terminal does not need to determine the third position to which the cursor is to move, but directly acquires the displacement of the cursor, and then controls the cursor to move according to the displacement of the cursor. This is not limited in this embodiment of the present disclosure.

In an example, it is assumed that displacement of the finger increases or decreases equally with the displacement of the cursor, that is, the sensitivity is 1. Assuming that the first position is denoted by InitCursorPos, the third position is denoted by CursorPos, and the displacement of the hand (the displacement of the hand is denoted by TipMovement) is acquired when it is detected that the hand moves while holding the target gesture, the first position, the displacement of the hand, and the third position satisfy the following relation: CursorPos=InitCursorPos+TipMovement.

706: The terminal executes, in response to a change in a gesture of the hand, a function of a key corresponding to a second position of the virtual keyboard, the second position being a position where the cursor is located when the gesture of the hand changes.

The user may stop holding the target gesture when moving the cursor to an expected position, such as the second position. If the terminal detects that the gesture of the hand has changed, the function of the key at the second position may be executed.

The virtual keyboard includes various types of keys: character keys, function keys, and so on. If the key corresponding to the second position belongs to a different type, the function executed by the terminal varies. Correspondingly, step 706 includes the following situations.

In Situation One, in response to the key corresponding to the second position being a character key, a character represented by the key corresponding to the second position is inputted in an input box or a character display region of the virtual keyboard.

In the Situation One, if a current input mode is English, or the current input mode is Chinese but the character key is not a letter key, the terminal may input the character represented by the key corresponding to the second position in the input box of the virtual keyboard. If the current input mode is Chinese and the character key is a letter key, the terminal may input the character represented by the key corresponding to the second position in the character display region.

In Situation Two, in response to the key corresponding to the second position being a delete key, the last character in the input box or character display region of the virtual keyboard is deleted.

In the Situation Two, the delete key is a function key, not for character input, but for deleting an inputted character. If the current input mode is English or Chinese and there is no inputted character in the character display region, the terminal may delete the last character in the input box of the virtual keyboard. If the current input mode is Chinese and there is an inputted character in the character display region, the terminal may delete the last character in the character display region.

In Situation Three, in response to the key corresponding to the second position being a new line key, it is displayed that an input cursor in the input box of the virtual keyboard changes to next line.

In Situation Four, in response to the key corresponding to the second position being a confirm key, content inputted in the input box of the virtual keyboard is taken as target content, and the display of the virtual keyboard is canceled.

The above only provides several example key types, but does not limit that the virtual keyboard includes only these types, and a person skilled in the art can arbitrarily set keys in the virtual keyboard according to a requirement. For example, the virtual keyboard further includes an exit key or a back key, and the terminal cancels the display of the virtual keyboard in response to the key corresponding to the second position being the exit key or the back key. In another example, the virtual keyboard further includes a parameter adjustment key, and the terminal adjusts a parameters of a current display interface in response to the key corresponding to the second position being the parameter adjustment key. The parameter includes at least one of a display parameter, a volume parameter, and a control parameter. This is not limited in this embodiment of the present disclosure.

Certainly, there is also a situation that the second position is not where the key is located, so the terminal can ignore this operation.

In some embodiments, the virtual keyboard further includes at least one virtual control. The terminal may further display, in response to detecting that the hand is not in the target gesture and the hand moves, that the cursor moves with the movement of the hand, and then execute, in response to detecting that the hand makes a target action and the cursor is located on a target virtual control in the at least one virtual control, a function corresponding to the target virtual control. A process of displaying that the cursor moves with the movement of the hand is similar to step 303 to step 305 above. Details are not described herein.

The target action is set by a relevant technician according to a requirement, or set by the user according to an operation habit. For example, the target action is a click/tap action, or the target action is a slap action, which is not limited in this embodiment of the present disclosure.

In some embodiments, the virtual control includes the following: a switch control for uppercase input and lowercase input, a switch control for symbol input and letter input, and a switch control for Chinese input and English input. The following is a description of these virtual controls.

The terminal switches, in response to the target virtual control being the switch control for uppercase input and lowercase input, a character displayed in the virtual keyboard between an uppercase input character and a lowercase input character.

In some embodiments, the uppercase input may also include uppercase input and caps lock input.

In some other embodiments, the terminal updates display content of the target virtual control, and the updated display content is consistent with the switching of the character in the virtual keyboard or the switching of the character input mode.

Figure 13:
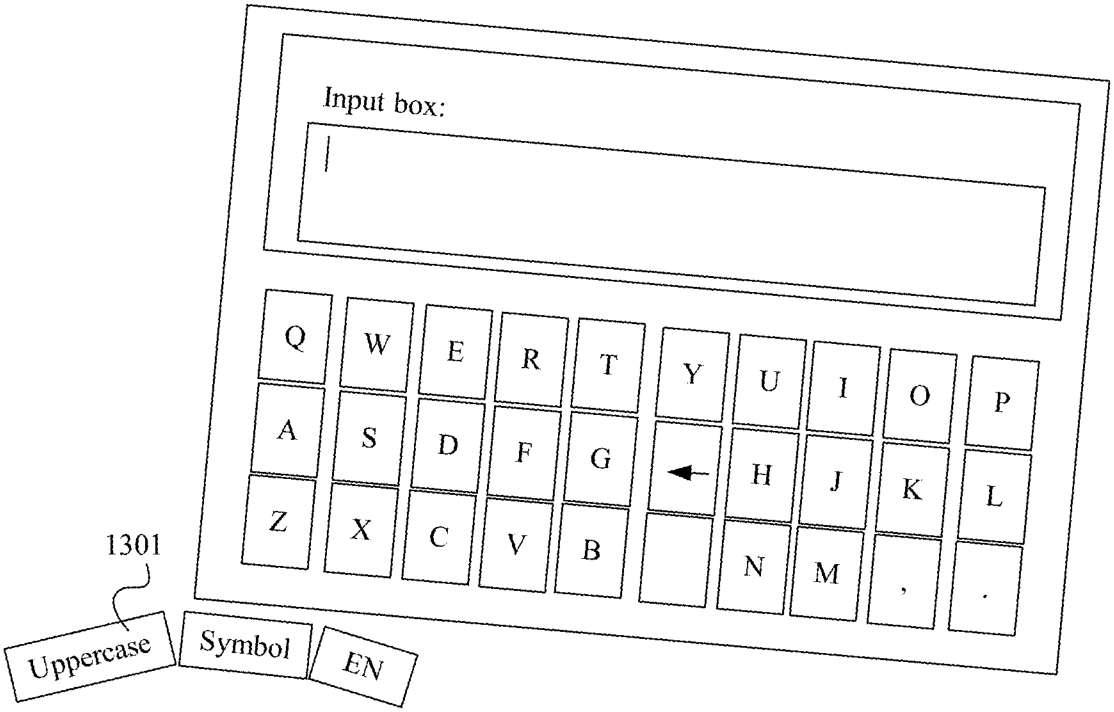
FIG. 13 is a schematic interface diagram of a terminal according to an embodiment of the present disclosure.

For example, as shown in FIG. 13, there are 3 types of case states: lowercase, uppercase, and caps lock. For example, the target action is a click/tap action, the user clicks/taps once when the cursor is on a case switching key 1301, next state may be entered, the first state may be entered when the key is pressed in the third state, and so on. A letter on the keyboard may switch to uppercase or lowercase according to the state, and the key may display a text or icon representation of a current state. In FIG. 13, for example, the case switching key 1301 displays "uppercase" in the uppercase state. When the user enters a letter in the uppercase state, the keyboard may automatically switch back to the lowercase state. In the caps lock state, the user may continuously enter capital letters.

In some embodiments, the terminal switches, in response to the target virtual control being a switch control for symbol input and letter input, the character displayed in the virtual keyboard between a letter and a symbol.

Figure 14:
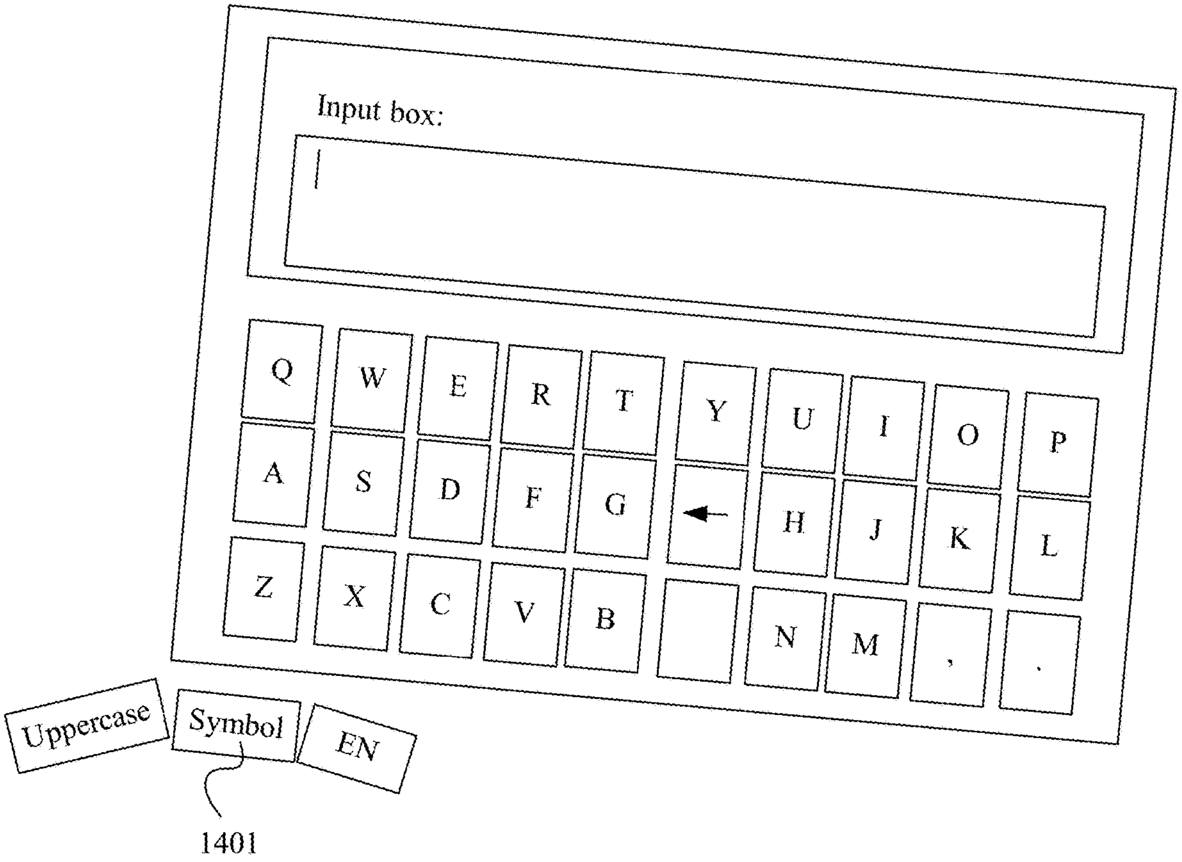
FIG. 14 is a schematic interface diagram of a terminal according to an embodiment of the present disclosure.

For example, as shown in FIG. 14, when the cursor is located on a switch control for symbol input and letter input 1401, the click/tap action is performed once, the switch control for symbol input and letter input 1401 may switch from a letter key to a symbol key, and correspondingly, a character displayed on the virtual keyboard may change from a letter to a symbol, as shown in FIG. 14. The letter key is switched back to if the click/tap action is performed again. Correspondingly, the character displayed on the virtual keyboard may change from the symbol to a letter.

The terminal switches, in response to the target virtual control being a switch control for Chinese input and English input, a character input mode of the virtual keyboard between Chinese input and English input.

Figure 15:
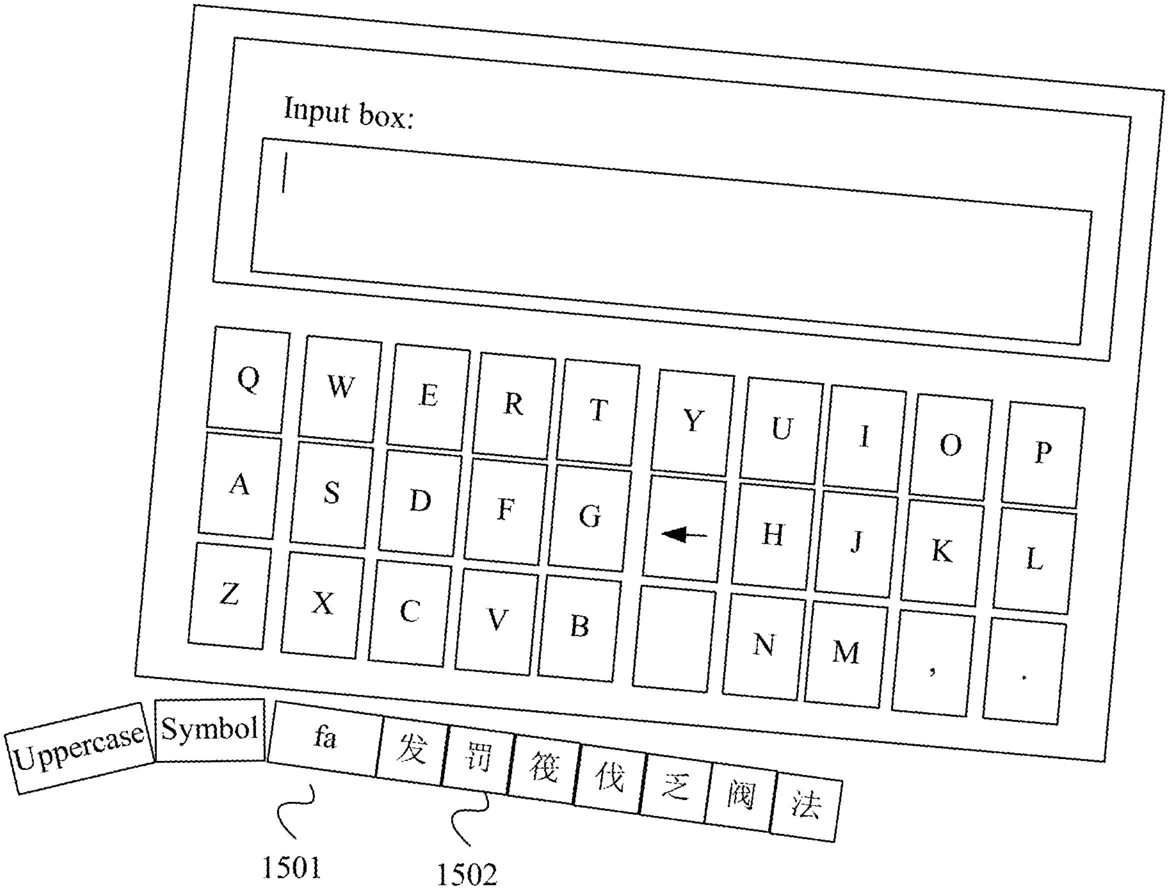
FIG. 15 is a schematic interface diagram of a terminal according to an embodiment of the present disclosure.

For example, as shown in FIG. 15, when the cursor is located on a switch control for Chinese input and English input 1501, the click/tap action is performed, the input mode may switch between English and Chinese Pinyin modes. In the English input mode, the switch control 1501 displays "EN", and in the Chinese input mode, the switch control 1501 displays "Pinyin". In the Chinese input mode, the user inputs pinyin through the above target gesture plus movement, and the pinyin may appear in the switch control 1501. In FIG. 15, for example, inputted pinyin is "fa", that is, the character display region is a region where the switch control 1501 is located. Certainly, the character display region may also be another region, and is not the region where the switch control 1501 is located.

In the case of non-English input, such as Chinese input, in response to a character combination inputted in the character display region of the virtual keyboard has a corresponding candidate non-English character, the terminal displays the candidate non-English character corresponding to the inputted character combination within a target range of the character display region. In the Chinese input mode, the character display region is a pinyin display region. If a character inputted in the character display region is a pinyin character for indicating pronunciation of a Chinese character, the inputted character combination represents pinyin of the candidate Chinese character.

For example, as shown in FIG. 15, the character display region includes a plurality of characters. The plurality of characters correspond to candidate Chinese characters, and the candidate Chinese characters may be displayed on the right. In FIG. 15, "fa" corresponds to a plurality of candidate Chinese characters, such as 发, 罚, 筏, 伐, 乏, 阀, and 法. Only "发, 罚, 筏, 伐, 乏, 阀, and 法" are illustrated in the figure. For other candidate Chinese characters, if the user performs a sliding action when the cursor is on the candidate Chinese character, the displayed candidate Chinese character can scroll to display the other candidate Chinese characters.

Figure 16:
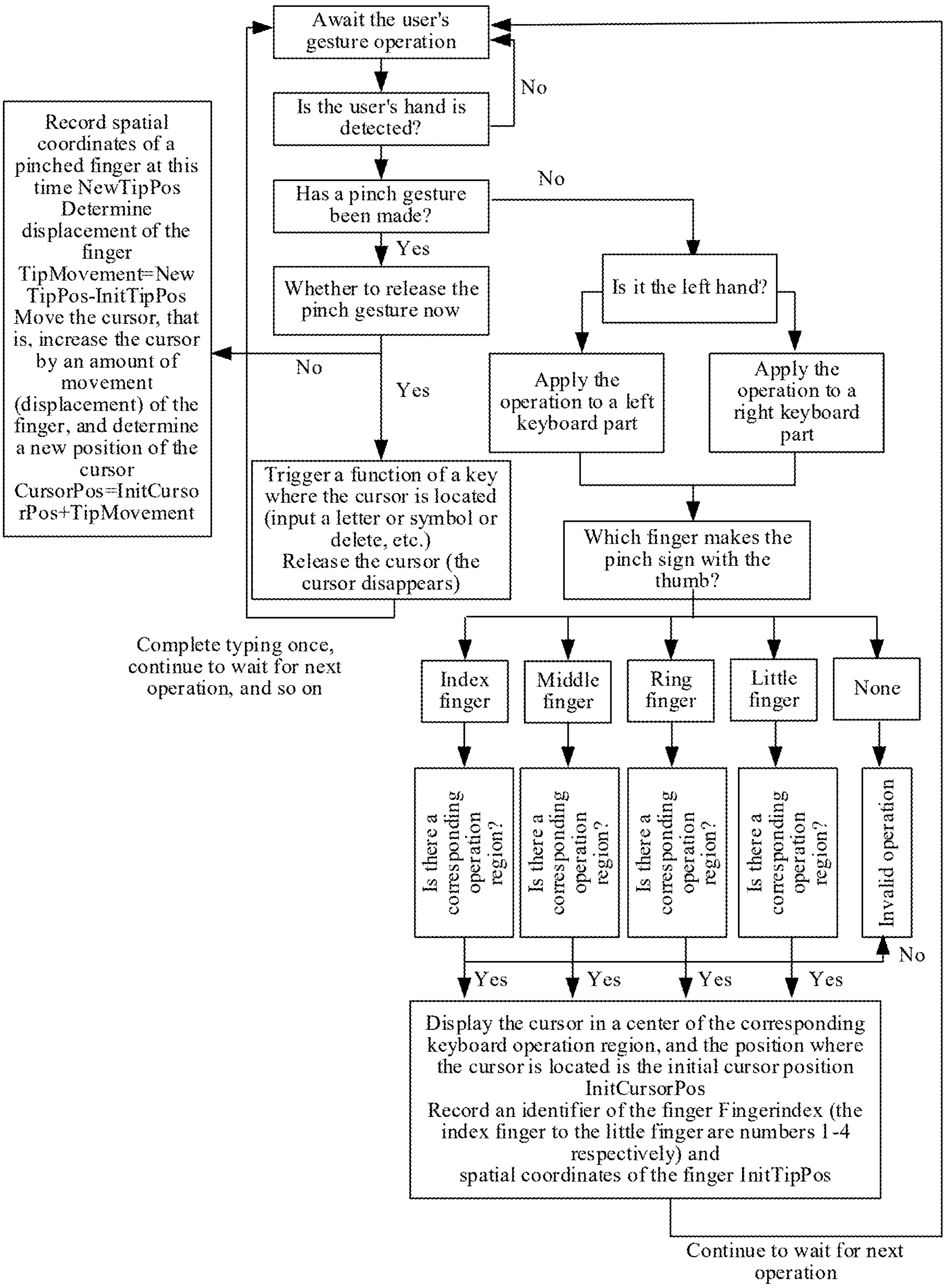
FIG. 16 is a schematic interface diagram of a terminal according to an embodiment of the present disclosure.
Figure 17:
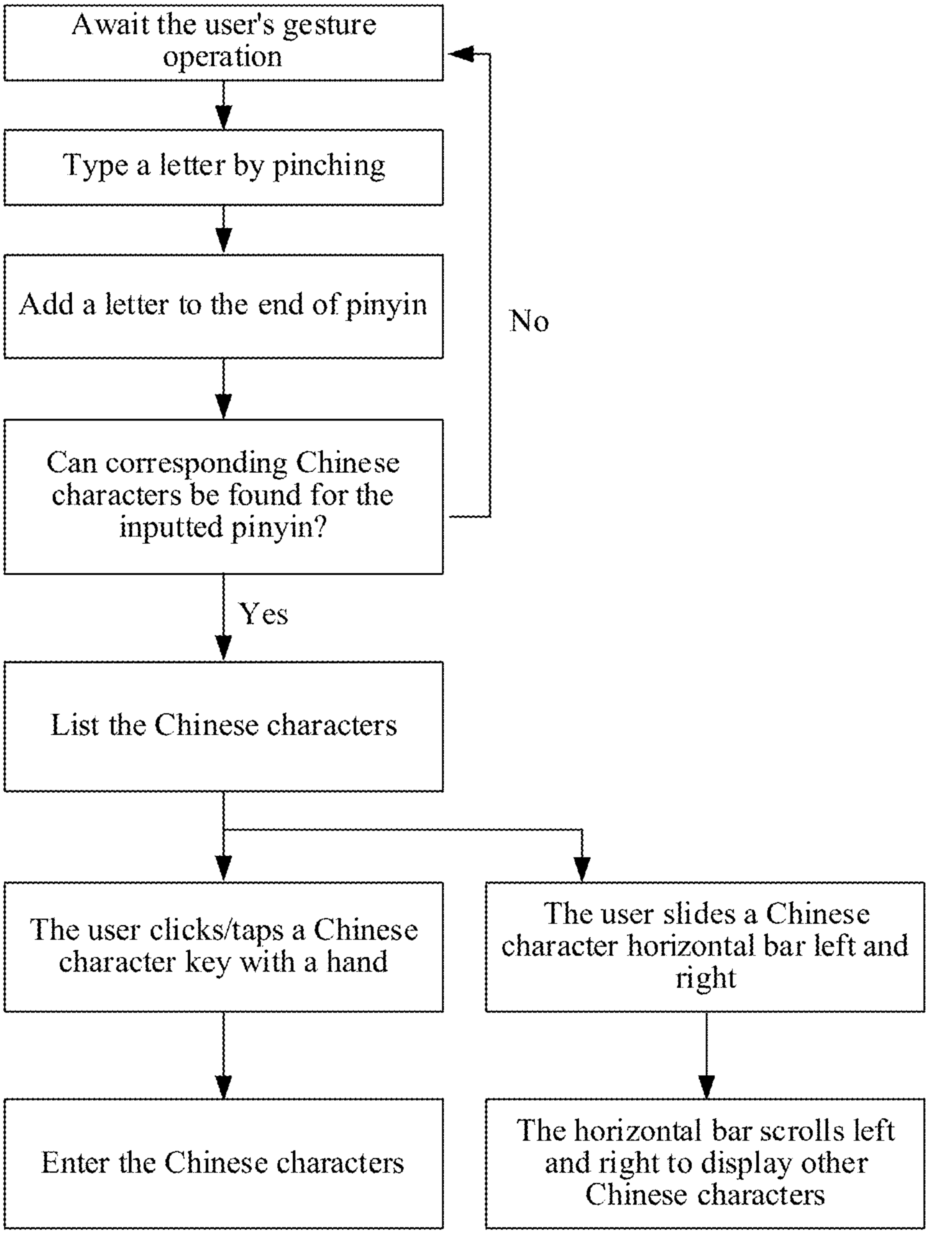
FIG. 17 is a schematic interface diagram of a terminal according to an embodiment of the present disclosure.

The above method is detailed in FIG. 16 and FIG. 17. For each detection period, the user's gesture operation is awaited. If there is a gesture operation, it is determined whether the user's hand is detected. If the hand is detected, it is determined whether a pinch gesture has been made. If yes, it indicates that the user currently holds the pinch gesture, and then it is determined whether the pinch gesture is currently released. If yes, a function of a key where the cursor is located is triggered, and the cursor is released. There are many kinds of key functions, and details are not described herein. If the gesture is not released, spatial coordinates of a pinched finger at this time NewTipPos are recorded. Displacement of the finger TipMovement is determined according to the spatial coordinates of the pinched finger New TipPos and previous spatial coordinates of the finger InitTipPos, and then the cursor is moved, that is, the cursor is increased by an amount of movement (displacement) of the finger. It is determined that a new position of the cursor CursorPos, InitCursorPos, and TipMovement satisfy the following relation: CursorPos=InitCursorPos+TipMovement. If it is determined that the pinch gesture has not been made before, that is, the pinch gesture is just currently detected, it is determined whether it is the left hand. If yes, the operation may be applied to a left keyboard part. If it is not the left hand, the operation may be applied to a right keyboard part. Then, it is determined which finger makes the pinch gesture with the thumb, and then it is determined according to the determined finger whether there is a corresponding keyboard operation region. If yes, the cursor is displayed in a center of the corresponding keyboard operation region. The position where the cursor is located is the initial cursor position InitCursorPos. Then, an identifier of the finger Fingerindex (the index finger to the little finger are numbers 1-4 respectively) may also be recorded, and then spatial coordinates of the finger InitTipPos are recorded.

In the Chinese input mode, when input of a letter is determined through the pinch gesture, the letter may be added to the end of inputted pinyin, and then it is determined whether corresponding Chinese characters have been found for the inputted pinyin. If yes, the Chinese characters are listed. If not, the user's gesture operation is continuously detected. When the Chinese characters are listed, the user performs a click/tap action to trigger a Chinese character key, and then enters the Chinese characters into the input box. Alternatively, the user slides a Chinese character horizontal bar left and right through a left and right sliding operation, so that the horizontal bar scrolls left and right to display other Chinese characters for the user to choose Chinese characters.

In the present disclosure, no handle is required, and virtual keys in the keyboard are triggered with pinch and move gestures. After the pinch gesture, from a center of a control region, a distance to each key in the control region may be shortened. The left hand or the right hand is a selection of a large region (select the left or right keyboard part), and each finger may be a selection of a small region (select one or two columns of keyboard keys). After the final key region is selected by pinching, the displacement of the gesture is utilized to make a precise key selection (a precise selection of up, middle, or down). Efficiency of the selection is improved by using the gesture, and at the same time, a degree of freedom of the selection of the final specific key is filled by using the displacement operation.

In this embodiment of the present disclosure, a combination of two operations, i.e., a gesture and movement, provides a flexible and easy-to-operate manner for a scene of triggering a key in the virtual keyboard. In the manner, a user can trigger the display of the cursor only by making a target gesture with a hand, and then can control the cursor to move by moving the hand while holding the target gesture. This operation is very simple and convenient and can also control the cursor to move to accurately select and trigger a single key, thereby improving granularity and accuracy of key triggering, which can realize input of any form of characters and thus has better applicability. In addition, when the target gesture is detected, a display position of the cursor can also be determined based on a biometric feature of the target gesture, so that the user can flexibly use different hands for gesture operations, so as to minimize a movement distance of the cursor, reduce operational complexity, and improve operational efficiency.

Other embodiment of the present disclosure may be formed by combining any of the foregoing technical solutions in different manners, and details are not described herein.

Figure 18:
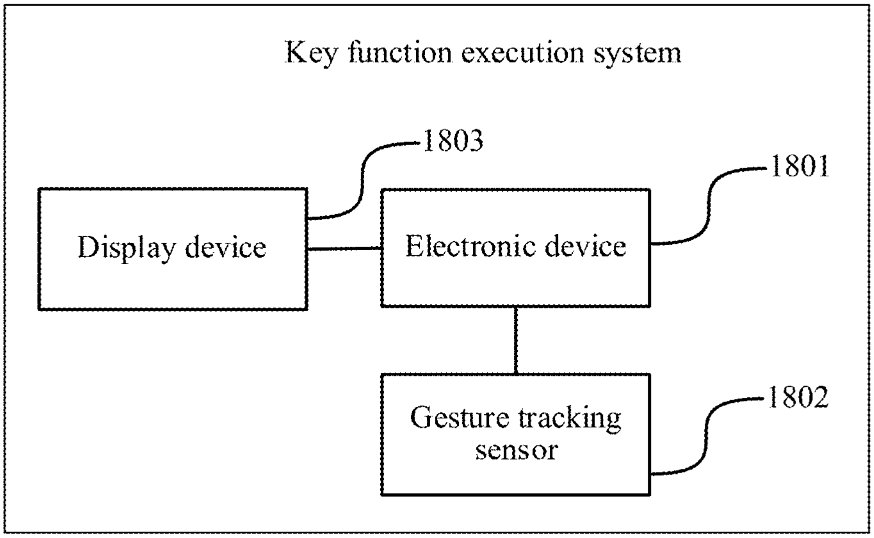
FIG. 18 is a schematic diagram of a key function execution system according to an embodiment of the present disclosure.

FIG. 18 is a schematic diagram of a key function execution system according to an embodiment of the present disclosure. The key function execution system includes an electronic device 1801, a gesture tracking sensor 1802, and a display device 1803. The gesture tracking sensor 1802 and the display device 1803 are connected to the electronic device 1801 respectively.

The display device 1803 is configured to display a virtual keyboard, the virtual keyboard including a first region and a second region, each of the first region and the second region including at least two keys, the first region corresponding to a left hand, and the second region corresponding to a right hand.

The gesture tracking sensor 1802 is configured to detect that a hand is in a target gesture.

The display device 1803 is further configured to display, in response to detecting that a hand is in a target gesture, a cursor at a first position according to a biometric feature of the target gesture, the first position being located in a region corresponding to the biometric feature in the virtual keyboard, the first position being a position corresponding to the biometric feature.

The gesture tracking sensor 1802 is further configured to detect that the hand makes a movement while keeping the target gesture.

The display device 1803 is further configured to display, in response to the hand making a movement while keeping the target gesture, that the cursor moves with the movement of the hand.

The electronic device 1801 is configured to execute, in response to a change in a gesture of the hand, a function of a key corresponding to a second position of the virtual keyboard, the second position being a position where the cursor is located when the gesture of the hand changes.

In some embodiments, the display device 1802 is a VR display device or a screen display.

In some embodiments, the display device 1802 is configured to:

- display, in response to the biometric feature indicating that the hand is the left hand, the cursor at a target position in the first region in the virtual keyboard; and
- display, in response to the biometric feature indicating that the hand is the right hand, the cursor at a target position in the second region in the virtual keyboard.

In some embodiments, the display device 1802 is configured to:

- determine, in response to the biometric feature indicating that the hand is the left hand and the target gesture is formed by the first finger and a thumb of the hand, that the cursor is displayed at a target position in a subregion corresponding to the first finger in the first region in the virtual keyboard; and determine, in response to the biometric feature indicating that the hand is the right hand and the target gesture is formed by a second finger and a thumb of the hand, that the cursor is displayed at a target position in a subregion corresponding to the second finger in the second region in the virtual keyboard.

In some embodiments, the target position is a central position of a region.

In some embodiments, the electronic device 1801 is configured to acquire, in response to the hand making a movement while keeping the target gesture, displacement of the hand; and determine a third position according to the first position and the displacement of the hand.

The display device 1802 is configured to display that the cursor moves from the first position to the third position.

In some embodiments, the display device 1802 is configured to perform any one of the following:

inputting, in response to the key corresponding to the second position being a character key, a character represented by the key corresponding to the second position into an input box or a character display region of the virtual keyboard;

deleting, in response to the key corresponding to the second position being a delete key, the last character in the input box or character display region of the virtual keyboard;

displaying, in response to the key corresponding to the second position being a new line key, that an input cursor in the input box of the virtual keyboard changes to next line; and taking, in response to the key corresponding to the second position being a confirm key, content inputted in the input box of the virtual keyboard as target content, and canceling the display of the virtual keyboard.

In some embodiments, the display device 1802 is further configured to display, in response to a character combination inputted in the character display region of the virtual keyboard has a corresponding candidate non-English character, the candidate non-English character corresponding to the inputted character combination within a target range of the character display region.

In some embodiments, the virtual keyboard further includes at least one virtual control.

The display device 1803 is further configured to display, in response to the hand being not in the target gesture and moving, that the cursor moves with the movement of the hand.

The electronic device 1801 is further configured to execute, in response to detecting that the hand makes a target action and the cursor is located on a target virtual control in the at least one virtual control, a function corresponding to the target virtual control.

In some embodiments, the electronic device 1801 is configured to:

switch, in response to the target virtual control being the switch control for uppercase input and lowercase input, a character displayed in the virtual keyboard between an uppercase input character and a lowercase input character;

switch, in response to the target virtual control being a switch control for symbol input and letter input, the character displayed in the virtual keyboard between a letter and a symbol; and switch, in response to the target virtual control being a switch control for Chinese input and English input, a character input mode of the virtual keyboard between Chinese input and English input.

In some embodiments, the display device 1802 is further configured to update display content of the target virtual control, and the updated display content is consistent with the switching of the character in the virtual keyboard or the switching of the character input mode.

Figure 19:
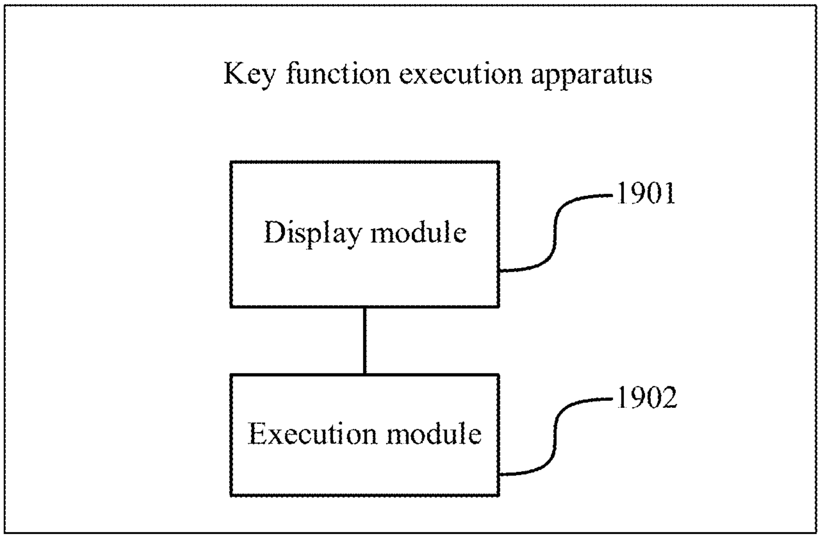
FIG. 19 is a schematic structural diagram of a key function execution apparatus according to an embodiment of the present disclosure.

FIG. 19 is a schematic structural diagram of a key function execution apparatus according to an embodiment of the present disclosure. Referring to FIG. 19, the apparatus includes:

a display module 1901 configured to display a virtual keyboard, the virtual keyboard including a first region and a second region, each of the first region and the second region including at least two keys, the first region corresponding to a left hand, and the second region corresponding to a right hand;

the display module 1901 being further configured to display, in response to detecting that a hand is in a target gesture, a cursor at a first position according to a biometric feature of the target gesture, the first position being located in a region corresponding to the biometric feature in the virtual keyboard, the first position being a position corresponding to the biometric feature;

the display module 1901 being further configured to display, in response to the hand making a movement while keeping the target gesture, that the cursor moves with the movement of the hand; and an execution module 1902 configured to execute, in response to a change in a gesture of the hand, a function of a key corresponding to a second position of the virtual keyboard, the second position being a position where the cursor is located when the gesture of the hand changes.

In some embodiments, the display module 1901 is configured to:

display, in response to the biometric feature indicating that the hand is the left hand, the cursor at a target position in the first region in the virtual keyboard; and display, in response to the biometric feature indicating that the hand is the right hand, the cursor at a target position in the second region in the virtual keyboard.

In some embodiments, the display module 1901 is configured to:

determine, in response to the biometric feature indicating that the hand is the left hand and the target gesture is formed by the first finger and a thumb of the hand, that the cursor is displayed at a target position in a subregion corresponding to the first finger in the first region in the virtual keyboard; and determine, in response to the biometric feature indicating that the hand is the right hand and the target gesture is formed by a second finger and a thumb of the hand, that the cursor is displayed at a target position in a subregion corresponding to the second finger in the second region in the virtual keyboard.

In some embodiments, the target position is a central position of a region.

In some embodiments, the display module 1901 is configured to:

acquire, in response to the hand making a movement while keeping the target gesture, displacement of the hand;

determine a third position according to the first position and the displacement of the hand; and display that the cursor moves from the first position to the third position.

In some embodiments, the execution module 1902 is configured to perform any one of the following:

inputting, in response to the key corresponding to the second position being a character key, a character represented by the key corresponding to the second position into an input box or a character display region of the virtual keyboard;

deleting, in response to the key corresponding to the second position being a delete key, the last character in the input box or character display region of the virtual keyboard;

displaying, in response to the key corresponding to the second position being a new line key, that an input cursor in the input box of the virtual keyboard changes to next line; and taking, in response to the key corresponding to the second position being a confirm key, content inputted in the input box of the virtual keyboard as target content, and canceling the display of the virtual keyboard.

In some embodiments, the display module 1901 is further configured to display, in response to a character combination inputted in the character display region of the virtual keyboard has a corresponding candidate non-English character, the candidate non-English character corresponding to the inputted character combination within a target range of the character display region.

In some embodiments, the virtual keyboard further includes at least one virtual control.

The display module 1901 is further configured to display, in response to the hand being not in the target gesture and moving, that the cursor moves with the movement of the hand.

The execution module 1902 is further configured to execute, in response to detecting that the hand makes a target action and the cursor is located on a target virtual control in the at least one virtual control, a function corresponding to the target virtual control.

In some embodiments, the execution module 1902 is configured to:

switch, in response to the target virtual control being the switch control for uppercase input and lowercase input, a character displayed in the virtual keyboard between an uppercase input character and a lowercase input character;

switch, in response to the target virtual control being a switch control for symbol input and letter input, the character displayed in the virtual keyboard between a letter and a symbol; and switch, in response to the target virtual control being a switch control for Chinese input and English input, a character input mode of the virtual keyboard between Chinese input and English input.

In some embodiments, the execution module 1902 is further configured to update display content of the target virtual control, and the updated display content is consistent with the switching of the character in the virtual keyboard or the switching of the character input mode.

The apparatus shown in this embodiment of the present disclosure is configured on an electronic device or configured on another device, which is not limited in this embodiment of the present disclosure.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In the embodiments of the present disclosure, a combination of two operations, i.e., a gesture and movement, provides a flexible and easy-to-operate manner for a scene of triggering a key in the virtual keyboard. In the manner, a user can trigger the display of the cursor only by making a target gesture with a hand, and then can control the cursor to move by moving the hand while holding the target gesture. This operation is very simple and convenient and can also control the cursor to move to accurately select and trigger a single key, thereby improving granularity and accuracy of key triggering, which can realize input of any form of characters and thus has better applicability. In addition, when the target gesture is detected, a display position of the cursor can also be determined based on a biometric feature of the target gesture, so that the user can flexibly use different hands for gesture operations, so as to minimize a movement distance of the cursor, reduce operational complexity, and improve operational efficiency.

When the key function execution apparatus provided in the foregoing embodiment implements the key functions, only division of the foregoing function modules is used as an example for description. In practical applications, the functions may be allocated to and completed by different function modules according to requirements. That is, an internal structure of the key function execution apparatus is divided into different function modules to complete all or some of the functions described above. In addition, the key function execution apparatus provided in the foregoing embodiments and the embodiments of the key function execution method belong to a same conception. For details of a specific implementation process, refer to the method embodiments. Details are not described herein again.

Figure 20:
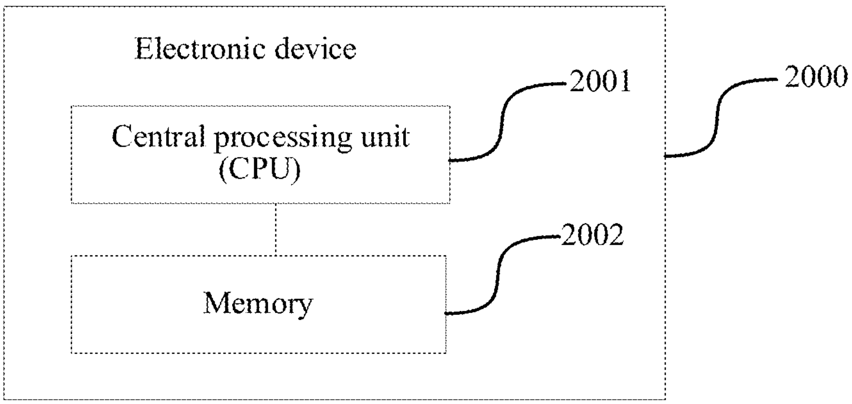
FIG. 20 is a schematic structural diagram of an electronic device according to an embodiment of the present disclosure.

FIG. 20 is a schematic structural diagram of an electronic device according to an embodiment of the present disclosure. The electronic device 2000 may vary a lot due to different configurations or performance, and may include one or more central processing units (CPUs) 2001 and one or more memories 2002. The one or more memories 2002 store at least one computer program. The at least one computer program is loaded and executed by the one or more CPUs 2001 to implement the key function execution method provided in the foregoing method embodiments. The electronic device further includes another component configured to implement functions of the device. For example, the electronic device further has components such as a wired or wireless network interface and an input/output (I/O) interface, to facilitate input and output. Details are not described herein in this embodiment of the present disclosure.

Figure 21:
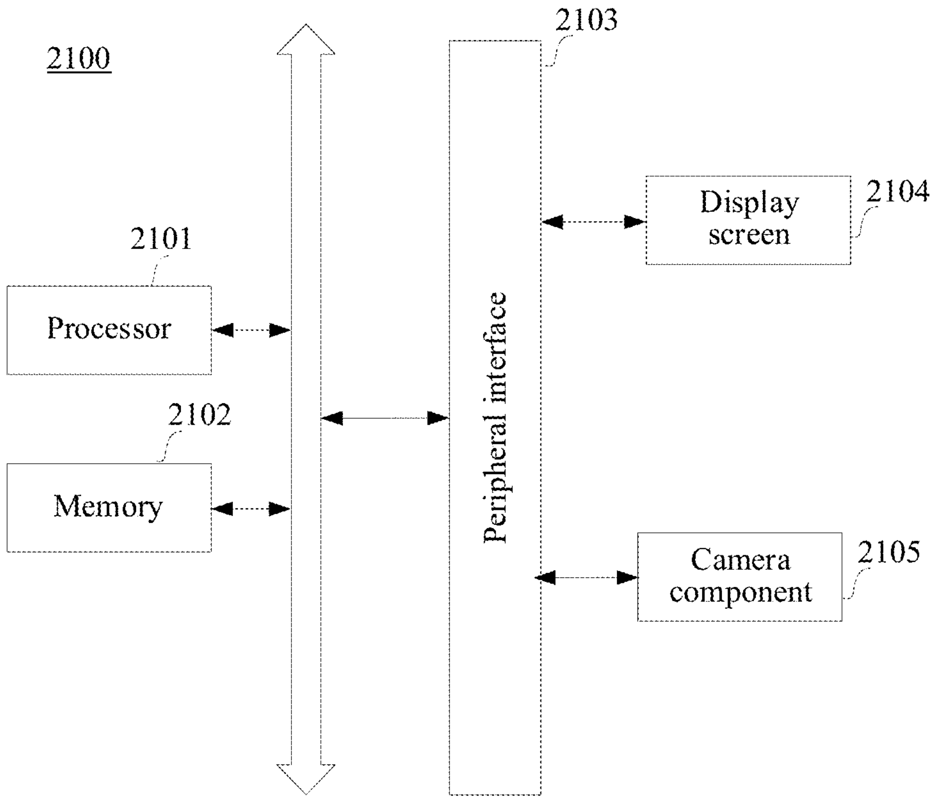
FIG. 21 is a structural block diagram of a terminal according to an embodiment of the present disclosure.

The electronic device in the above method embodiment is implemented as a terminal. For example, FIG. 21 is a structural block diagram of a terminal according to an embodiment of the present disclosure. The terminal 2100 includes: a processor 2101 and a memory 2102.

The processor 2101 may include one or more processing cores, for example, a 4-core processor or an 8-core processor. The processor 2101 may be implemented in at least one hardware form of a digital signal processor (DSP), a field-programmable gate array (FPGA), and a programmable logic array (PLA). In some embodiments, the processor 2101 may further include an artificial intelligence (AI)

processor. The AI processor is configured to process computing operations related to machine learning.

The memory 2102 may include one or more computer-readable storage media. The computer-readable storage media may be non-transient. In some embodiments, the non-transient computer-readable storage media in the memory 2102 are configured to store at least one instruction. The at least one instruction is used for being executed by the processor 2101 to implement the key function execution method provided in the method embodiments of the present disclosure.

In some embodiments, the terminal 2100 may further include: a peripheral interface 2103 and at least one peripheral. The processor 2101, the memory 2102, and the peripheral interface 2103 may be connected through a bus or a signal line. Each peripheral may be connected to the peripheral interface 2103 through a bus, a signal line, or a circuit board. Specifically, the peripheral includes: at least one of a display screen 2104 and a camera component 2105.

The peripheral interface 2103 may be configured to connect the at least one peripheral related to I/O to the processor 2101 and the memory 2102. In some embodiments, the processor 2101, the memory 2102, and the peripheral interface 2103 may be integrated on a same chip or circuit board. In some embodiments, any one or two of the processor 2101, the memory 2102, and the peripheral interface 2103 may be implemented on a single chip or circuit board, which is not limited in this embodiment.

The display screen 2104 is configured to display a user interface (UI). The UI may include a graph, text, an icon, a video, and any combination thereof. When the display screen 2104 is a touch display screen, the display screen 2104 further has a capability of acquiring a touch signal on or above a surface of the display screen 2104. The touch signal may be inputted to the processor 2101 as a control signal for processing. In this case, the display screen 2104 may be further configured to provide a virtual button and/or a virtual keyboard that are/is also referred to as a soft button and/or a soft keyboard.

The camera component 2105 is configured to capture images or videos. In some embodiments, the camera component 2105 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve a background blur function through fusion of the main camera and the depth-of-field camera, panoramic shooting and VR shooting functions through fusion of the main camera and the wide-angle camera, or other fusion shooting functions.

In some embodiments, the terminal 2100 further includes one or more sensors. The one or more sensors include, but are not limited to, an acceleration sensor, a gyroscope sensor, a pressure sensor, an optical sensor, and a proximity sensor.

A person skilled in the art may understand that the structure shown in FIG. 21 constitutes no limitation on the terminal 2100, and the terminal may include more or fewer components than those shown in the figure, or some components may be combined, or a different component deployment may be used.

Figure 22:
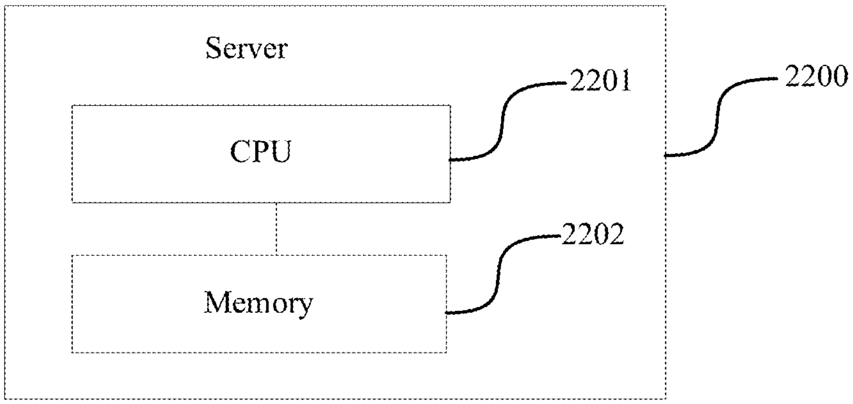
FIG. 22 is a schematic structural diagram of a server according to an embodiment of the present disclosure.

The electronic device in the above method embodiment is implemented as a server. For example, FIG. 22 is a schematic structural diagram of a server according to an embodiment of the present disclosure. The server 2200 may vary a lot due to different configurations or performance, and may include one or more CPUs 2201 and one or more memories 2202. The one or more memories 2202 store at least one computer program. The at least one computer program is loaded and executed by the one or more CPUs 2201 to implement the key function execution method provided in the foregoing method embodiments. Certainly, the server further has components such as a wired or wireless network interface and an I/O interface, to facilitate input and output. The server further includes another component configured to implement a function of a device. Details are not described herein.

In an exemplary embodiment, a computer-readable storage medium, such as a memory including at least one computer program, is further provided. The above at least one computer program may be executed by a processor to complete the key function execution method in the foregoing embodiments. For example, the computer-readable storage medium is a read-only memory (ROM), a random access memory (RAM), a compact disc read-only memory (CD-ROM), a magnetic tape, a floppy disk, an optical data storage device, or the like.

In an exemplary embodiment, a computer program product or computer program is further provided. The computer program product or computer program includes one or more program codes. The one or more program codes are stored in a computer-readable storage medium. One or more processors of an electronic device read the one or more program codes from the computer-readable storage medium. The one or more processors execute the one or more program codes to cause the electronic device to perform the above key function execution method.

In some embodiments, the computer program as referred to in the embodiments of the present disclosure may be deployed to be executed on a computer device, or deployed to be executed on a plurality of computer devices at a same location, or deployed to be executed on a plurality of computer devices that are distributed in a plurality of locations and interconnected through a communication network. The plurality of computer devices that are distributed in the plurality of locations and interconnected through the communication network may form a blockchain network.

A person of ordinary skill in the art may understand that all or some of the steps of the above embodiments may be implemented by hardware or a program instructing related hardware. The program is stored in a computer-readable storage medium. The storage medium described above is an ROM, a magnetic disk, an optical disc, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A key function execution method, applied to a key function execution system, the method comprising:

displaying a virtual keyboard, the virtual keyboard comprising a first region and a second region, the first region and the second region respectively comprising at least two keys, the first region corresponding to a left hand, and the second region corresponding to a right hand;

displaying, in response to detecting that a hand is in a target gesture, a cursor at a first position according to a biometric feature of the target gesture, the biometric feature indicating whether the hand is the left hand or the right hand and at least one finger of the hand forming the target gesture, the first position being in a region corresponding to the biometric feature in the virtual keyboard, the first position being a position corresponding to the biometric feature;

displaying, in response to the hand making a movement while keeping the target gesture, that the cursor moves with the movement of the hand; and executing, in response to a change in a gesture of the hand, a function of a key corresponding to a second position of the virtual keyboard, the second position being a position where the cursor is located when the gesture of the hand changes.

2. The method according to claim 1, wherein the displaying a cursor at a first position according to a biometric feature of the target gesture, the first position being located in a region corresponding to the biometric feature in the virtual keyboard comprises:

displaying, in response to the biometric feature indicating that the hand is the left hand, the cursor at a target position in the first region in the virtual keyboard; and displaying, in response to the biometric feature indicating that the hand is the right hand, the cursor at a target position in the second region in the virtual keyboard.

3. The method according to claim 1, wherein the displaying a cursor at a first position according to a biometric feature of the target gesture comprises:

displaying, in response to the biometric feature indicating that the hand is the left hand and the target gesture is formed by a first finger and a thumb of the hand, the cursor at a target position in a subregion corresponding to the first finger in the first region; and displaying, in response to the biometric feature indicating that the hand is the right hand and the target gesture is formed by a second finger and a thumb of the hand, the cursor at a target position in a subregion corresponding to the second finger in the second region.

4. The method according to claim 2, wherein the target position is a central position of a region.

5. The method according to claim 1, wherein the displaying, in response to the hand making a movement while keeping the target gesture, that the cursor moves with the movement of the hand comprises:

acquiring, in response to the hand making the movement while keeping the target gesture, displacement of the hand;

determining a third position according to the first position and the displacement of the hand; and displaying that the cursor moves from the first position to the third position.

6. The method according to claim 1, wherein the executing a function of a key corresponding to a second position of the virtual keyboard comprises any one of the following:

inputting, in response to the key corresponding to the second position being a character key, a character represented by the key corresponding to the second position into an input box or a character display region of the virtual keyboard;

deleting, in response to the key corresponding to the second position being a delete key, a last character in the input box or character display region of the virtual keyboard;

displaying, in response to the key corresponding to the second position being a new line key, that an input cursor in the input box of the virtual keyboard changes to next line; and taking, in response to the key corresponding to the second position being a confirm key, content inputted in the input box of the virtual keyboard as target content, and canceling the display of the virtual keyboard.

7. The method according to claim 1, wherein the method further comprises:

displaying, in response to a character combination inputted in the character display region of the virtual keyboard has a corresponding candidate non-English character, the candidate non-English character within a target range of the character display region.

8. The method according to claim 1, wherein the virtual keyboard further comprises at least one virtual control; and the method further comprises:

displaying, in response to detecting that the hand is not in the target gesture and the hand moves, that the cursor moves with the movement of the hand; and executing, in response to detecting that the hand makes a target action and the cursor is located on a target virtual control in the at least one virtual control, a function corresponding to the target virtual control.

9. The method according to claim 8, wherein the executing a function corresponding to the target virtual control comprises:

switching, in response to the target virtual control being a switch control for uppercase input and lowercase input, a character displayed in the virtual keyboard between an uppercase input character and a lowercase input character;

switching, in response to the target virtual control being a switch control for symbol input and letter input, the character displayed in the virtual keyboard between a letter and a symbol; and switching, in response to the target virtual control being a switch control for Chinese input and English input, a character input mode of the virtual keyboard between Chinese input and English input.

10. The method according to claim 9, wherein the executing a function corresponding to the target virtual control further comprises:

updating display content of the target virtual control, the updated display content being consistent with the switching of the character in the virtual keyboard or the switching of the character input mode.

11. A key function execution system, the system comprising an electronic device, and a display device connected to the electronic device; wherein:

the electronic device is coupled to a gesture tracking sensor;

the display device is configured to;

display a virtual keyboard, the virtual keyboard comprising a first region and a second region, the first region and the second region respectively comprising at least two keys, the first region corresponding to a left hand, and the second region corresponding to a right hand;

display, in response to a hand being in a target gesture, a cursor at a first position according to a biometric feature of the target gesture, the biometric feature indicating whether the hand is the left hand or the right hand and at least one finger of the hand forming the target gesture, the first position being located in a region corresponding to the biometric feature in the virtual keyboard, the first position being a position corresponding to the biometric feature; and display, in response to the hand making a movement while keeping the target gesture, that the cursor moves with the movement of the hand; and the electronic device is configured to execute, in response to a change in a gesture of the hand, a function of a key corresponding to a second position of the virtual keyboard, the second position being a position where the cursor is located when the gesture of the hand changes.

12. The system according to claim 11, wherein the display device is further configured to:

display, in response to the biometric feature indicating that the hand is the left hand, the cursor at a target position in the first region in the virtual keyboard; and display, in response to the biometric feature indicating that the hand is the right hand, the cursor at a target position in the second region in the virtual keyboard.

13. The system according to claim 11, wherein the display device is further configured to:

display, in response to the biometric feature indicating that the hand is the left hand and the target gesture is formed by a first finger and a thumb of the hand, the cursor at a target position in a subregion corresponding to the first finger in the first region; and display, in response to the biometric feature indicating that the hand is the right hand and the target gesture is formed by a second finger and a thumb of the hand, the cursor at a target position in a subregion corresponding to the second finger in the second region.

14. The system according to claim 12, wherein the target position is a central position of a region.

15. The system according to claim 11, wherein:

the electronic device is further configured to acquire, in response to the hand making the movement while keeping the target gesture, displacement of the hand; and determine a third position according to the first position and the displacement of the hand; and the display device is further configured to display that the cursor moves from the first position to the third position.

16. The system according to claim 11, wherein the electronic device is further configured to perform any one of the following:

inputting, in response to the key corresponding to the second position being a character key, a character represented by the key corresponding to the second position into an input box or a character display region of the virtual keyboard;

deleting, in response to the key corresponding to the second position being a delete key, a last character in the input box or character display region of the virtual keyboard;

displaying, in response to the key corresponding to the second position being a new line key, that an input cursor in the input box of the virtual keyboard changes to next line; and taking, in response to the key corresponding to the second position being a confirm key, content inputted in the input box of the virtual keyboard as target content, and canceling the display of the virtual keyboard.

17. The system according to claim 11, wherein the display device is further configured to:

display, in response to a character combination inputted in the character display region of the virtual keyboard has a corresponding candidate non-English character, the candidate non-English character within a target range of the character display region.

18. The system according to claim 11, wherein:

the virtual keyboard further comprises at least one virtual control;

the display device is further configured to display, in response to detecting that the hand is not in the target gesture and the hand moves, that the cursor moves with the movement of the hand; and the electronic device is further configured to execute, in response to detecting that the hand makes a target action and the cursor is located on a target virtual control in the at least one virtual control, a function corresponding to the target virtual control.

19. The system according to claim 11, wherein the display device is a virtual reality (VR) display device or a screen display.

20. A non-transitory computer-readable storage medium, the storage medium storing at least one computer program, the at least one computer program being loaded and executed by a processor to implement:

displaying a virtual keyboard, the virtual keyboard comprising a first region and a second region, the first region and the second region respectively comprising at least two keys, the first region corresponding to a left hand, and the second region corresponding to a right hand;

displaying, in response to detecting that a hand is in a target gesture, a cursor at a first position according to a biometric feature of the target gesture, the biometric feature indicating whether the hand is the left hand or the right hand and at least one finger of the hand forming the target gesture, the first position being in a region corresponding to the biometric feature in the virtual keyboard, the first position being a position corresponding to the biometric feature;

displaying, in response to the hand making a movement while keeping the target gesture, that the cursor moves with the movement of the hand; and executing, in response to a change in a gesture of the hand, a function of a key corresponding to a second position of the virtual keyboard, the second position being a position where the cursor is located when the gesture of the hand changes.

* * * * *